United States Patent [19]

Dravida et al.

[11] Patent Number: 5,253,248
[45] Date of Patent: Oct. 12, 1993

[54] CONGESTION CONTROL FOR CONNECTIONLESS TRAFFIC IN DATA NETWORKS VIA ALTERNATE ROUTING

[75] Inventors: Subrahmanyam Dravida, Toms River; P. Harshavardhana, Freehold, both of N.J.

[73] Assignee: AT&T Bell Laboratories, Murray Hill, N.J.

[21] Appl. No.: 548,457

[22] Filed: Jul. 3, 1990

[51] Int. Cl.$^5$ .............................................. H04L 12/56
[52] U.S. Cl. ...................................... 370/16; 370/95.3
[58] Field of Search ................... 370/16, 94.1, 94.3, 370/60; 340/825.01, 825.03, 826, 827; 455/8, 50.1, 52.1; 375/38, 58

[56] References Cited

U.S. PATENT DOCUMENTS

| | | | |
|---|---|---|---|
| 4,466,060 | 8/1984 | Riddle | 364/200 |
| 5,018,133 | 5/1991 | Tsukakoshi et al. | 340/827 |
| 5,115,433 | 5/1992 | Baran et al. | 370/95.3 |
| 5,142,531 | 8/1992 | Kirby | 370/95.3 |

OTHER PUBLICATIONS

"An Effective Local Dynamic Strategy to Clear Congested Multidestination Networks", IEEE Trans. Autom. Control, P. E. Sarachik, Apr. 1982 vol. 27, No. 2, pp. 510–513.
"Performance Evaluation of the Computer Network Dynamic Congestion Table Algorithm", IEEE Trans. Comput., C. A. Niznik, Feb. 1984, vol. C-33, No. 2, pp. 150–159.
"A Gateway Dynamic Congestion Table Algorithm for Computer Internetworks," Proc. of IEEE IN-FOCOM'85, C. A. Niznik, 1985, pp. 99–108.
"Dynamic Flow and Overload Control in a Packet Switching Network", Proc. of the 8th Int. Conf. on Comp. Comm., V. G. Lazarev, et al. 1986, pp. 654–658.
"On Congestion Based Dynamic Routing", Proc. IEEE Int. Conf. on Comm. '87, D. W. Glazer, et al., 1987, vol. 2, pp. 974–979.
"Interior Gateway Protocols", Internetworking With TCP/IP: Principles, Protocols and Architecture, D. E. Comer, 1988, Chapt. 15, pp. 181–191.
"An Extended Least-Hop Distributed Routing Algorithm", IEEE Tran. on Comm., D. J. Nelson, et al., Apr. 1990, vol. 38, No. 4, pp. 520–528.
"Congestion Controls in DDX Packet Switched Network", Electr. Commun. Lab. Tech. J. (Japan), K. Kuroda, et al., 1981, vol. 30, No. 3, pp. 695–705.

Primary Examiner—Benedict V. Safourer
Attorney, Agent, or Firm—Barry H. Freedman

[57] ABSTRACT

A congestion control scheme for connectionless networks relieves congestion by routing a portion of traffic on a congested primary path onto a predefined alternate path constructed such that loop-freedom is guaranteed. Explicit care is taken to avoid spreading congestion onto alternate paths. The control actions are taken in a completely distributed manner, based on local measurements only and therefore no signaling messages need to be exchanged between nodes.

If desired, lower loss priority may be assigned to alternate routed traffic. Congestion is monitored locally and thresholds defined to declare the onset and abatement of congestion. The present invention affords at least an order of magnitude improvement in end-to-end cell blocking under sustained focussed overload.

24 Claims, 16 Drawing Sheets

CONGESTION CONTROL FOR CONNECTIONLESS TRAFFIC IN DATA NETWORKS VIA ALTERNATE ROUTING

TECHNICAL FIELD

The present invention relates generally to data communications, and, in particular, to a congestion control scheme for connectionless traffic in data networks.

BACKGROUND OF THE INVENTION

Connectionless data networks (such as the ARPANET network) permit the interchange of packetized data between interconnected nodes without the need for fixed or centralized network routing administration. Each node examines packet header information and makes routing decisions based only upon locally available information, without explicit knowledge of where the packet originated or of the entire route to the destination node. In this environment, traditional congestion control strategies such as window flow control and per virtual circuit buffering and pacing cannot be used because of the absence of end-to-end acknowledgements.

One congestion control approach that has been implemented in some connectionless networks is the use of choke messages. In this method, a congested node sends feedback messages to other nodes, asking them not send traffic to it until further notification. There are several drawbacks to this approach: first, by the time the choke message reaches the offending node, a substantial amount of traffic would have been transmitted. For example, in a network consisting of 150 Mbps trunks, a choke packet sent on 1000 mile long link takes 10 msecs of propagation time. In this time, 1.5M bits are already in transit and will contribute to existing congestion. Secondly, in connectionless networks, there is no knowledge of the path traversed by a packet before arriving at a given node; therefore, choke messages may have to be sent to all the neighbors including those that do not contribute to congestion. This will lead to underutilization of the network. Another difficulty with this method is the action taken by a node upon receiving a choke packet. If it drops all packets headed towards the congested node, then subsequent retransmissions will contribute to increased congestion. Since there is no connection-oriented layer that the network interacts with, it is difficult to stop traffic at the sources responsible for causing congestion. Therefore choke messages do not appear to be an effective means of congestion control in connectionless networks.

Certain other approaches that have been tried in connectionless networks such as ARPANET involve changing network routing in response to changes in traffic conditions, by dynamically recomputing paths between nodes in a completely distributed fashion. This can be illustrated by considering the RIP scheme which has been tried in ARPANET. In RIP, each node stores the entire network topology, and periodically transmits routing update messages to its neighboring nodes. The routing update messages provide reachability information which tells each neighboring node how the originating node can reach the other nodes in the network, together with some measure of the minimum distance to the various nodes. The measure of distance used is different in different versions of RIP. The original RIP protocol used hop-counts to measure distance, while subsequent modifications use delay estimates to reach a destination as a measure of distance.

The problem with the RIP scheme is that it has several serious drawbacks: first, a large amount of information must be exchanged between nodes in order to ensure consistent routing changes, and this itself may consume significant network resources. Second, because paths are dynamically recomputed, there is serious potential for problems such as packet looping, packet missequencing and route oscillations. Also, because of propagation delay, the information exchanged between nodes may be outdated, and hence may not be reliable for changing routing. This problem is especially serious in high speed networks (>45 mbps).

A second dynamic routing protocol called IGRP uses a composite metric which includes propagation delay, path bandwidth, path utilization and path reliability, as a measure of distance. If the minimum distance path is different from the one currently in use, then all the traffic is switched to the newly computed shortest path. If a set of paths are "equivalent", load balancing is used.

When dynamic changes in routing are occasioned by the IGRP protocol, traffic shifts from one path to another, so that congestion may be caused on the new path. Subsequent distance and shortest path computation may then switch the traffic back onto the original path. In this manner each path would experience oscillations in offered traffic and the end result may well be that neither path is fully utilized. This problem may only be partly alleviated by averaging the distance measurements over an interval of time before transmitting to the other nodes.

A third, very recent proposed enhancement to the ARPANET routing protocol described in "An Extended Least-Hop Distributed Routing Algorithm," written by D. J. Nelson, K. Sayood, and H. Chang, published in IEEE Transactions on Communications, Vol. 38, No. 4, April 1990, pages 520–528, augments the set of available shortest path routes to carry packets to a given destination by including routes that are one hop longer than the shortest path routes. Each node maintains an estimate of the total delay involved in reaching every destination. The route which has the minimum delay to a given destination is then picked from the set of routes available to carry traffic to that destination. Although this approach shows considerable improvement over the existing ARPANET routing, it also has several disadvantages. First, the optimal, minimum delay path has to be chosen for each packet, leading to increased processing in the switch. Second, at any given time, only one path is active and hence there is no notion of load balancing. All traffic is routed on the same path until a path with a better delay estimate is available. Third, nodes need to exchange delay information and hence some form of signaling between nodes is necessary. Lastly, only paths that are one hop longer are considered in addition to the shortest paths. Thus, some longer idle paths will not be chosen, even though they could have successfully carried the traffic.

Yet another possibility for dealing with congestion is to try to reduce the impact of its consequences. For example, one way of avoiding packet losses due to buffer overflow is to increase the link buffer sizes. There is a serious drawback to this approach: if the buffer size is made very large, cells will experience high queueing delays and end-to-end performance may be affected to the extent that the end systems may time-out and retransmit. On the other hand, if the buffer size is designed to keep the maximum queueing delay within acceptable bounds, then since the buffer occupancy tends to increase exponentially as the link utilization approaches unity, buffers will eventually overflow in the face of sustained focussed overload on the link and the resulting cell losses will cause the end systems to retransmit. Thus, increasing the buffer size is not a viable congestion control strategy.

SUMMARY OF THE INVENTION

In accordance with the present invention, congestion caused by transient focussed overloads in connectionless networks is relieved by routing a portion of traffic intended for a congested primary path onto a predefined alternate path. An explicit algorithm is used for constructing alternate paths in such a way that loop-freedom is guaranteed. Briefly, this is done by organizing the nodes that neighbor a given node into layers such that nodes that are the same distance (in hops) from a given destination are in the same layer. A weight is then assigned to each possible path between (a) the given node and each neighbor in the same layer, and (b) each neighbor and a node in a closer layer (in hops) to which the neighboring node is connected. The pairwise sum of the weights for each combination of paths is then computed and the alternate path is determined as the path having the minimum sum. Furthermore, care is taken to avoid spreading congestion onto alternate paths by marking alternately routed packets, so that they are more readily dropped in the event that congestion is again encountered at nodes further along the alternate path. By appropriately choosing threshold values for initiating a transition to an alternate route and for reverting to a primary route, route oscillations can be avoided. The routing determinations and network control actions are taken in a completely distributed manner based on local measurements only, and therefore no signaling messages or routing data need to be exchanged between network nodes. The invention is most useful in conjunction with data networks where traffic tends to be very bursty, because when some paths are busy, it is quite likely that others are relatively idle. Accordingly, when there is non-coincidence of overloads on various parts of the network, our invention provides the greatest benefits.

Brief Description of the Drawing

The present invention will be more fully appreciated by reference to the following detailed description, when read in light of the accompanying drawing in which.

DETAILED DESCRIPTION

In order to fully understand the alternate routing technique of the present invention, it is instructive to first consider one technique that can be employed to determine the primary path taken by messages traveling between nodes in a connectionless network under normal (i.e., non-congested) conditions. This technique is distributed adaptive minimum spanning tree routing, sometimes also known as "exclusionary tree" routing, details of which can be found in U.S. Pat. No. 4,466,060 issued to G. G. Riddle on Aug. 14, 1984. Other routing techniques are described in D. E. Comer's book, "Internetworking With TCP/IP: Principles, Protocols and Architecture," Chapter 15: Interior Gateway Protocols, Prentice Hall, 1988. The overall objective of the exclusionary tree technique is to maintain a table of correct shortest paths to all destinations at each node of the network. For this purpose, routing tables are initially constructed and updated whenever there are topological changes in the network, as for example, when a node or link is added or deleted. The update procedures are implemented at each node independently, in a distributed fashion. The resulting routing tables are designed to yield minimum hop paths to all destinations in such a way that there is no looping.

Two principal steps are at the heart of the exclusionary tree routing technique: (1) Each node sends an exclusionary tree to each of its neighbors, and (2) a prescribed procedure is employed at each of the nodes to merge the received exclusionary trees into a routing table. These two steps are repeated at each node until the routing tables converge.

Figure 1:
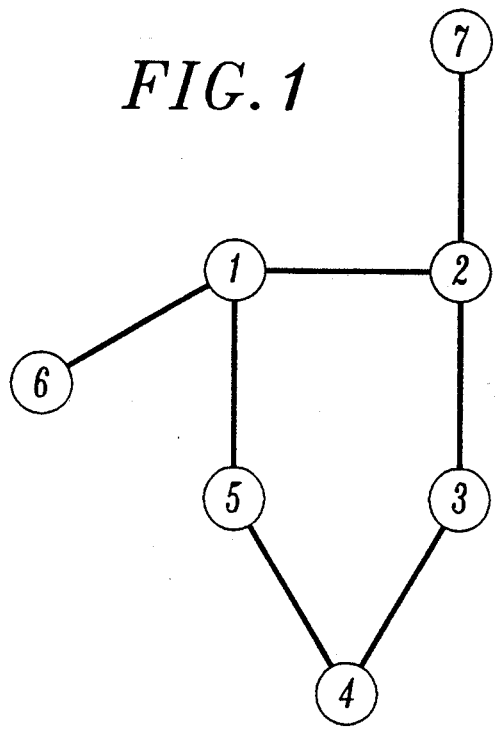
FIG. 1 is a diagram illustrating the interconnection of an exemplary network having seven nodes.
Figure 2:
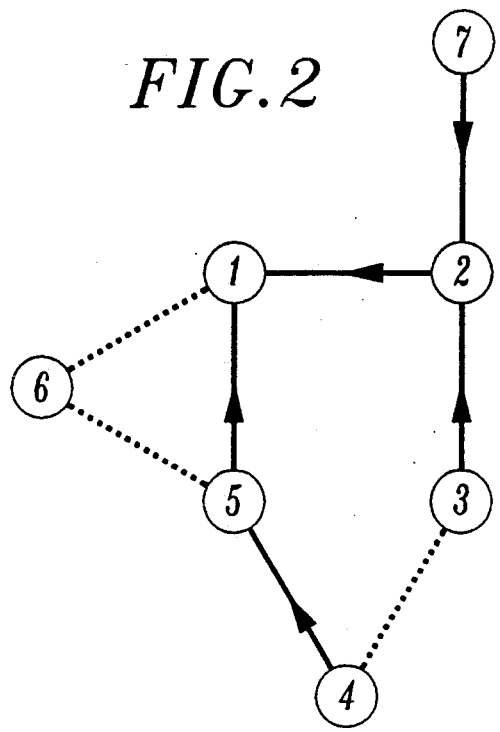
FIGS. 2-4 illustrate the "exclusionary trees" developed by one of the nodes in the network of FIG. 1.
Figure 3:
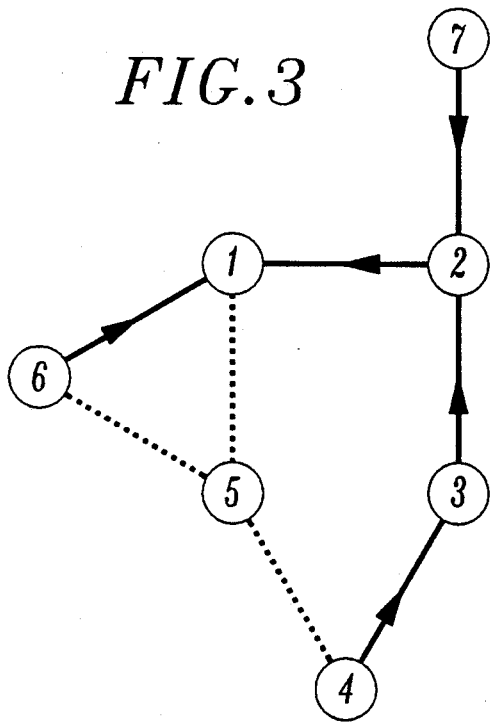
Figure 4:
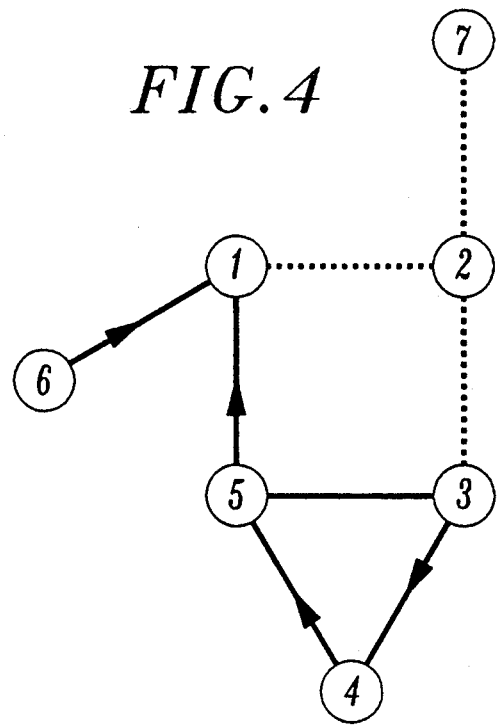
Figure 5:
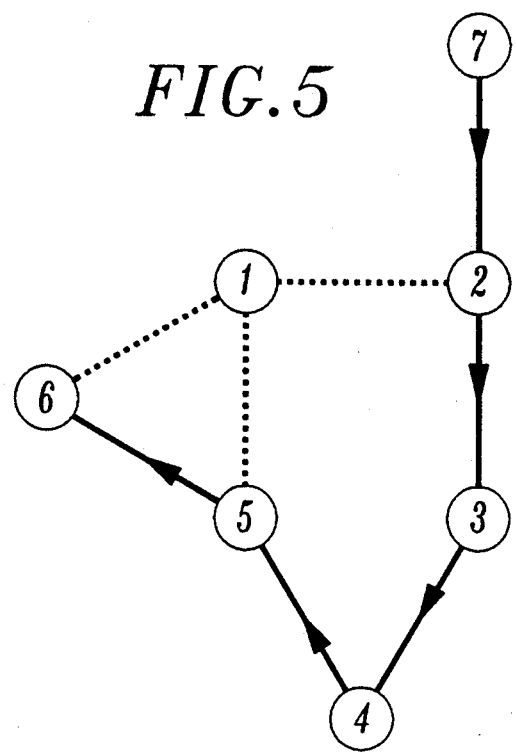
FIGS. 5-7 illustrate the "exclusionary trees" received by one of the nodes in the network of FIG. 1.
Figure 6:
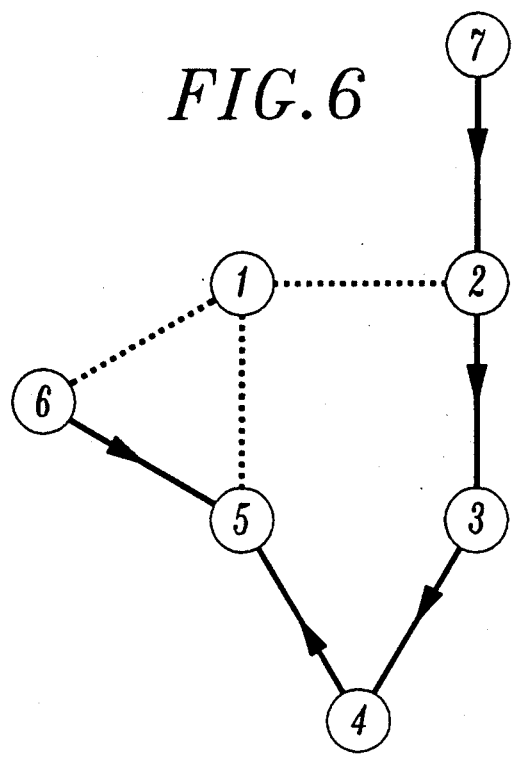
Figure 7:
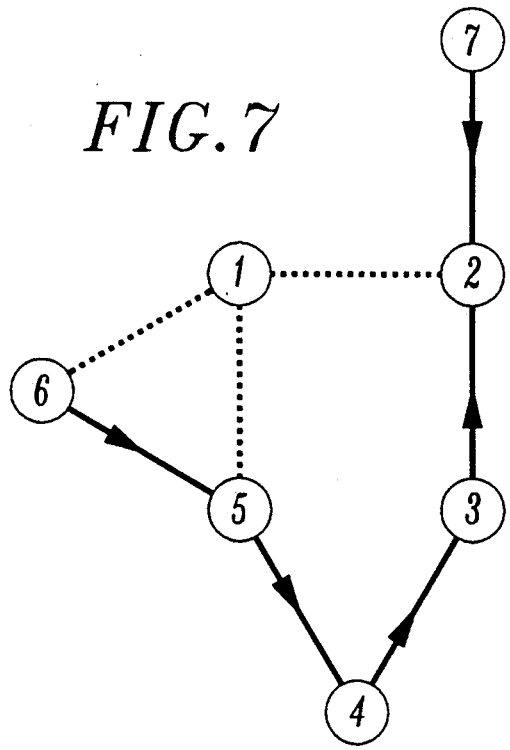
Figure 8:
FIGS. 8-10 illustrate the "exclusionary trees" of FIGS. 5-7, respectively, which have been redrawn so that each successive node descending from a root node is placed at the same vertical level.
Figure 9:
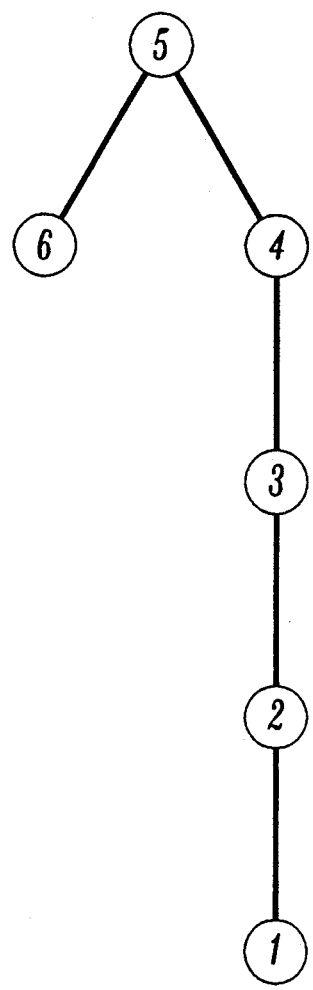
Figure 10:
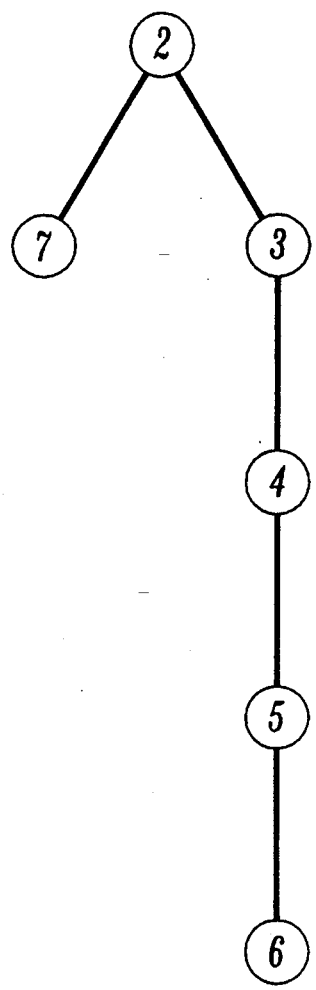
Figure 11:
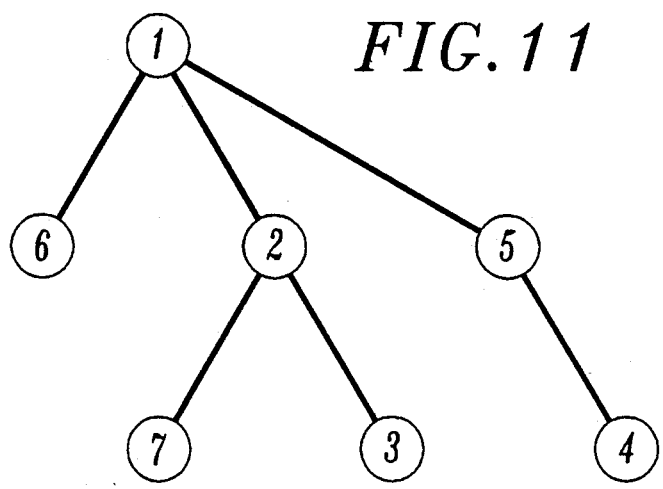
FIG. 11 illustrates the result when the "exclusionary trees" of FIGS. 8-10 are merged.

The exclusionary tree routing technique can be best described through the following example. Consider the network consisting of seven nodes 1–7 shown in FIG. 1. Each node sends an exclusionary tree to each of its neighbors. An exclusionary tree is the shortest path tree obtained after deleting all links connected to the receiving node. FIGS. 2–4 illustrate the exclusionary trees sent by node 1 to its neighbors, namely nodes 6, 5 and 2, respectively. FIGS. 5–7 show the exclusionary trees received by node 1 from its neighbors, nodes 6, 4 and 2, respectively. The received exclusionary trees are each first redrawn with their nodes descending from the root, each successive node being placed at a vertical level corresponding to its distance in hops from node 1, as shown in FIGS. 8–10. The merged tree for node 1 shown in FIG. 11 is obtained by merging the exclusionary trees of FIGS. 8–10 received by node 1 from its neighbors, according to the following procedure: The received exclusionary tree's nodes at a distance of one hop are visited from left to right (in the example, node 6, then node 5, then node 2) and placed in the merged tree of FIG. 11). Next, nodes at a distance of two hops are visited in the same order (left to right) and are attached to their parent nodes, if they are not already there at a lesser distance. This procedure is repeated successively to create a merged tree. If the node of interest is present in more than one received exclusionary tree at the same distance in hops, then each root node is represented in the merged tree, resulting in multiple entries for nodes that have multiple equal length routes. This situation did not occur in FIG. 11. Whenever multiple equal length routes exist, traffic is distributed over all such routes so as to achieve load balancing. It is to be noted here that other techniques can also be used to determine the primary network routing used in the absence of congestion.

Figure 12:
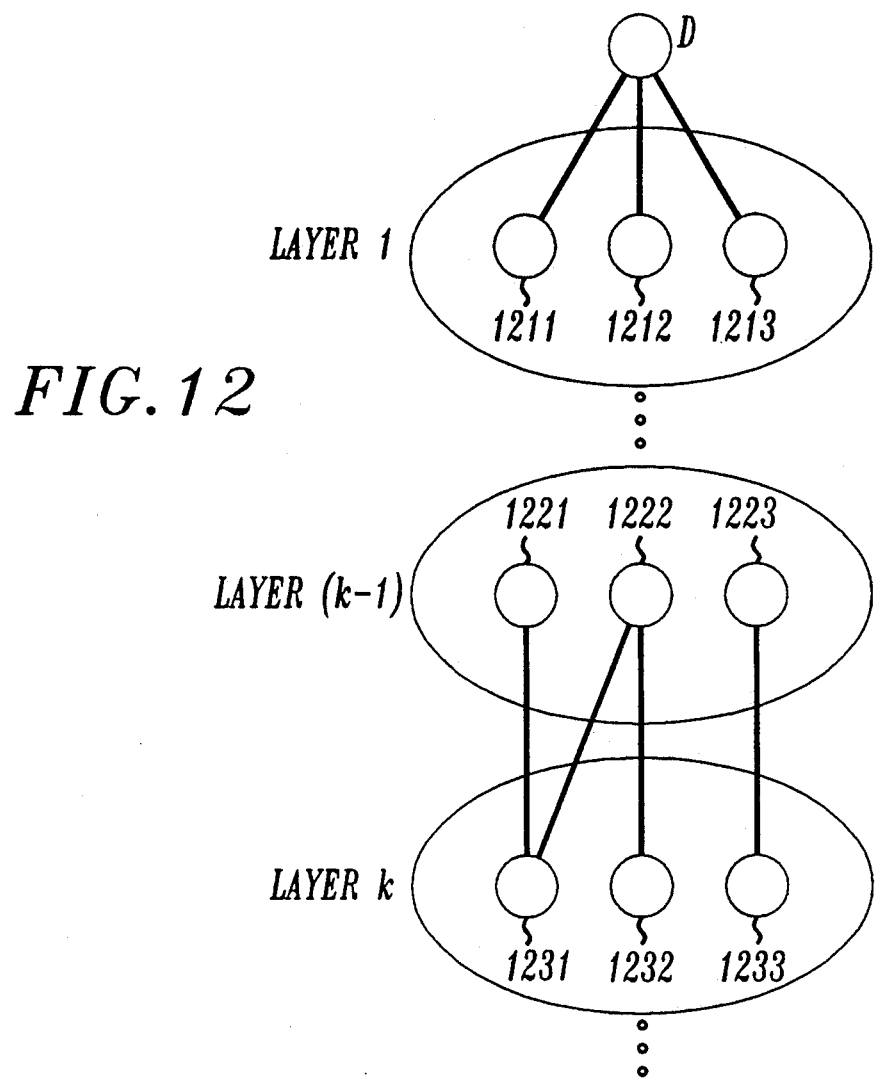
FIG. 12 illustrates the "layering" of nodes in a network with respect to a destination node.

In accordance with our invention, during times of congestion, some fraction of the packets normally routed on primary routes are instead routed on secondary or alternate paths that are lightly loaded. The manner in which alternate routes are selected will be better understood by first considering an arbitrary network which is depicted in the form of a layered architecture in FIG. 12. The layering in FIG. 12 is with respect to destination node D, such that nodes 1231–1233 in layer k (k is an integer) have at least one k-hop shortest path to D. This means that every node in layer k must have at least one link connecting it to a node in layer (k−1). If a node in layer k is connected to more than one node (1221–1223) in layer (k−1), then it has more than one k-hop shortest path to D. These are precisely the multiple shortest paths constructed by the exclusionary tree routing algorithm described above. By exploiting the connectivity between nodes 1231–1233 in layer k, our technique is used to generate loop-free alternate paths to D which are at least of length (k+1) hops. There are two ways of doing this. Both assume that only shortest path primary routes are permitted.

In the first method, if all nodes are numbered, and if we let nodes i and j (i and j are integers) belong to layer k and let node i and j be connected by a link, then node i can alternate route packets intended for destination D via node j if i<j. This method is loop-free, because the primary routes are hierarchical shortest path routes, while the secondary (alternate) routes essentially create a hierarchy within layer k. For example, FIG. 13 shows 4 nodes numbered 1301–1304 in layer k connected to 4 nodes numbered 1311–1314 in layer (k−1).

Figure 13:
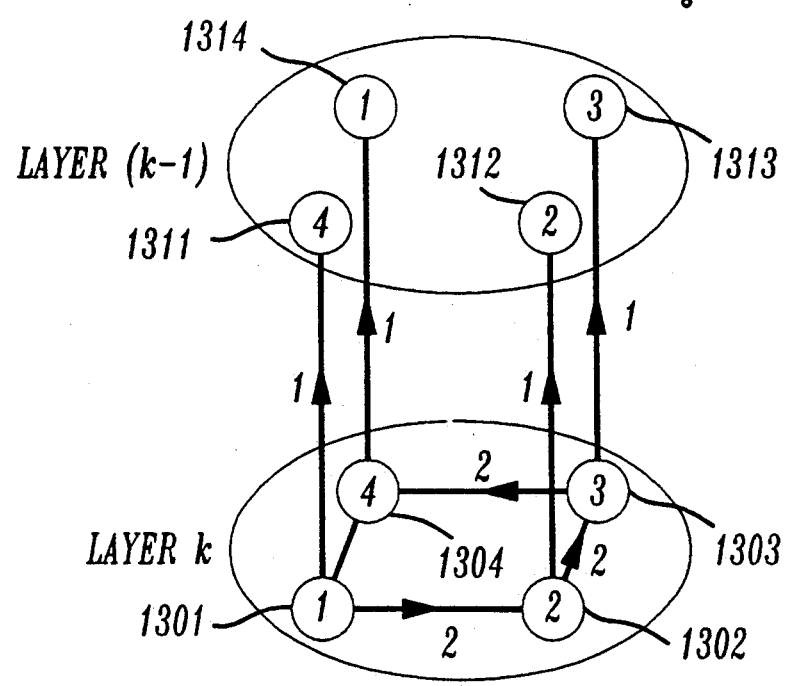
FIG. 13 illustrates primary and alternate paths between some of the nodes in FIG. 12.

In FIG. 13, routing choices marked 1 are primary routes and routing choices marked 2 are secondary routes. It is clear that no inter-layer looping is possible since there is no downward routing—a node in layer (k−1) cannot route to a node in layer k. No intra-layer looping is possible, because node 1304 cannot alternate route to any of the other (lower numbered) nodes. This first method is simple to implement, but has the disadvantage that the highest numbered node (e.g., node 1304) in every layer is denied an alternate route. This disadvantage is overcome, albeit at the cost of added complexity, in the second method.

Figure 14:
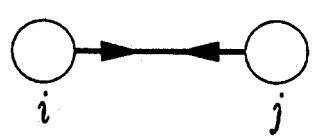
FIGS. 14 and 15 illustrate undesirable single link looping between a pair of nodes.
Figure 15:
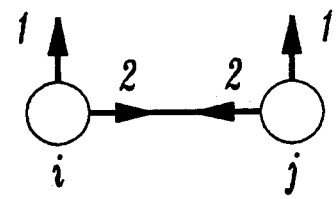

In the second method, we require two additional pieces of information. These are:

(i) the ability to avoid single link loops of the form shown in FIG. 14, wherein node i must recognize that a packet was routed to it by node j, and must prevent the packet from going back to node j. This is necessary to avoid looping between nodes i and j when i and j route to each other on a second choice basis. As shown in FIG. 15, i.e., when the primary paths out of both nodes i and j are unavailable (due to congestion), packets must not be allowed to loop between i and j, but should be dropped.

(ii) Every node i must be assigned weights $w(i,j)$ with respect to all other nodes j to which it is connected. Further, the weights must be chosen so that:

(a) they are symmetric, i.e., $w(i,j) = w(j,i)$ for all i and j, and (b) $w(i,j) + w(j,k)$ is unique, in the sense that $w(i,j) + w(j,k) = w(i,l) + w(l,m) => j=l$ and $k=m$.

This condition means that for any two nodes that have at least one two-hop path connecting them, there is a *unique* minimum weight two-hop path connecting the two nodes. One way of satisfying condition (b) is to choose weights so that the pairwise sum is unique, i.e., such that no two sums are the same. As will be described below, the weight information can be transmitted to each node together with the exclusionary tree routing information. The reason why the assignment of these weights is necessary will be also explained below.

Figure 16:
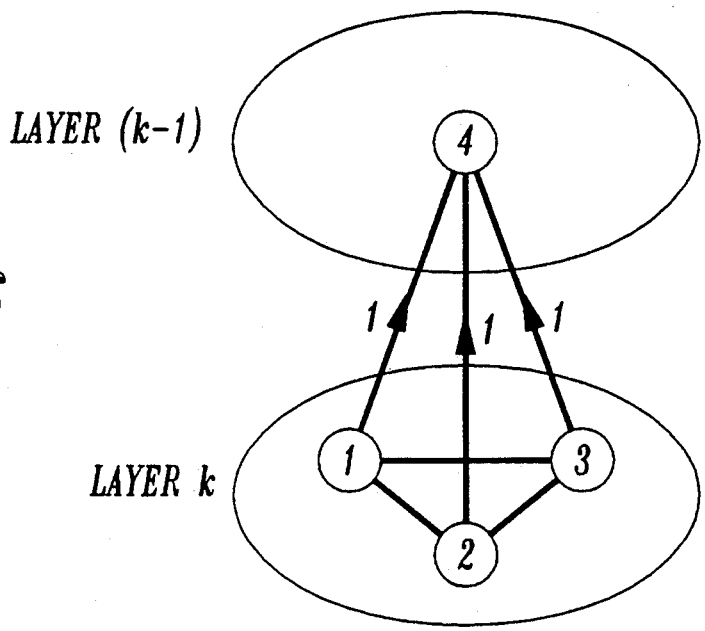
FIG. 16 illustrates one example of our alternate routing technique as applied to a four node network in which three nodes are located in a first layer and the fourth node is located in a second layer.

Under the above conditions, the fact that our alternate routing technique is loop-free can be demonstrated as follows:

Let nodes 1,2, . . . m be in layer k and nodes 1',2',3', . . . m' be in layer (k−1). The nodes in layer (k−1) may be repeated and are not necessarily unique (for notational convenience). Let us suppose that node i in layer k is connected to node i' in layer (k−1). There is no loss of generality in doing this because, even if layer (k−1) has a single node, it can be repeated m times. For example, FIG. 16, which shows links between nodes 1–3 of layer k and node 4 of layer k−1 may be redrawn as FIG. 17, in which node 1 is linked to node 1', node 2 is linked to node 2' and node 3 is linked to node 3', as long as nodes 1',2' and 3' are each "equal" to node 4.

The route i→i' is always the primary route from node i, for all packets to a particular destination D (with respect to which the network has been layered). With this notation in mind, our loop-free alternate routing technique may be expressed in the following manner:

Routing Rule: Let nodes i,j and l belong to layer k and nodes j' and l' belong to layer k−1. Then, node i alternate routes to node j if and only if $$\min_{l \in \text{layer } K} \{w(i,l) + w(l,l')\} = w(i,j) + w(j,j') \quad (1)$$

Figure 18:
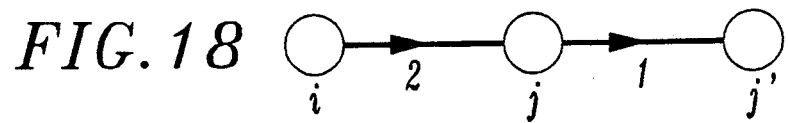
FIG. 18 illustrates alternate and primary routing paths between a first node i and a second node j.

Equation 1 is illustrated diagrammatically in FIG. 18, in which nodes i, j and j' are shown. In that figure, the link between nodes i and j is marked 2, indicating that this is the secondary path from node i to node j in layer k; the link between nodes j and j' is marked 1, indicating that this is the primary path from node j in layer k to node j' in layer k−1. In accordance with our technique, $w(i,j) + w(j,j')$ is then the unique minimum weight 2-hop path to get from node i to *any* node in layer (k−1).

Figure 17:
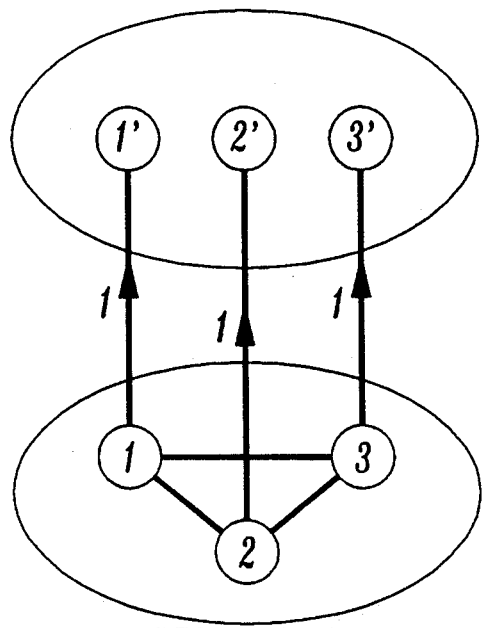
FIG. 17 is a redrawn version of FIG. 16 in which the fourth node is replaced by three "equivalent" nodes.
Figure 19:
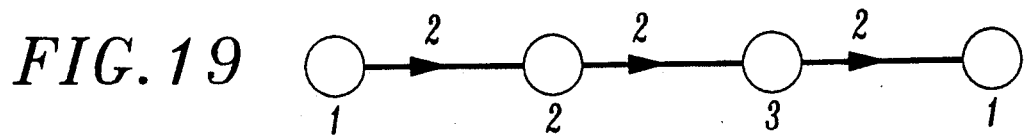
FIG. 19 illustrates alternate routing between the three nodes in the first layer of FIG. 17 that would lead to undesirable looping.

The loop-free property of our technique can be demonstrated by first considering the case when m=3, i.e., three nodes in layer k. Assume that nodes in layer k are fully connected. The corresponding network is shown in FIG. 17. The connectivity between nodes in layer (k−1) is not important, and, hence, is not shown. The only possibility of looping occurs if each node in layer k alternate routes to a node in layer k that has not previously served as an alternate. For example, the situation illustrated in FIG. 19 is a loop, because node 1 alternate routes (marked "2") to node 2, node 2 alternate routes to node 3, and node 3 alternate routes back to node 1. Using our technique, such a loop cannot occur, because if node 1 alternate routes to node 2, and node 2 alternate routes to node 3, then node 3 must necessarily alternate route to node 2, so that a loop *cannot* occur. Now, the fact that node 1 alternate routes to node 2 implies that:

$$w(1,2) + w(2,2') < w(1,3) + w(3,3') \quad (2)$$

Next, the fact that node 2 alternate routes to node 3 implies that $$w(2,3) + w(3,3') < w(2,1) + w(1,1') \quad (3)$$

Adding inequalities (2) and (3) and noting that $w(i,j) = w(j,i)$, we get $$w(3,2) + w(2,2') < w(3,1) + w(1,1') \quad (4)$$

which implies that node 3 alternate routes to node 2.

Thus, a three link loop cannot occur. However, a single-link loop may occur and hence the nodes must have the ability to recognize and prevent a single-link loop. Such a capability can be implemented simply in each node by preventing messages or packets from departing from the node on the same link that they arrived on. This is discussed in more detail below.

It should be noted that if the weights $w(i,j)$ are chosen to be the actual distance $d(i,j)$ between nodes i and j, then our invention leads to shortest distance alternate routing, which would be very important in a geographically dispersed network. However, while the symmetry property, viz., $d(i,j) = d(j,i)$ is satisfied, the uniqueness property is not guaranteed. To ensure uniqueness, the internodal distances may have to be infinitesimally perturbed so that if $$d(i,j) + d(j,j') = d(i,k) + d(k,k'), \quad (5)$$

then $d(i,j)$ is changed to $d(i,j) + \epsilon$, where $\epsilon$ is an arbitrary small number. However, it may be noted that since $d(i,j)$ are real numbers, practically speaking the uniqueness condition is generally satisfied. The distance information can easily be provided to each node when the distributed shortest path route is determined, by providing V,H coordinates. If $V_i H_i$ and $V_j H_j$ are coordinates for two connected nodes i and j, the distance $d(i,j)$ is given by $$d(i,j) = \frac{\sqrt{(V_i - V_j)^2 + (H_i - H_j)^2}}{\sqrt{10}}.$$

Other fully distributed techniques can be used to find a mapping between the nodes, i,j and j' used in alternate routing and the weights $w(i,j), w(j,j')$ associated with the links between the nodes. For example, if each node, i,j,j' has a unique integer number, then $w(i,j)$ can be arbitrarily defined as $(i^q + j^q)$ and $w(j,j')$ can be likewise defined as $(j^q + j'^q)$, where q is a suitably chosen integer. Other mappings $(i, j) \rightarrow w(i, j)$ such that $w(i,j) = w(j, i)$ and $w(i,j) + w(j,j') = w(i,l) + w(l,l') => j = l$ can also be found. However, weight assignments may also be centrally administered, and the appropriate weights periodically downloaded to each node when there is a topographical change in the network, without significantly degrading the performance of the network.

Figure 20:
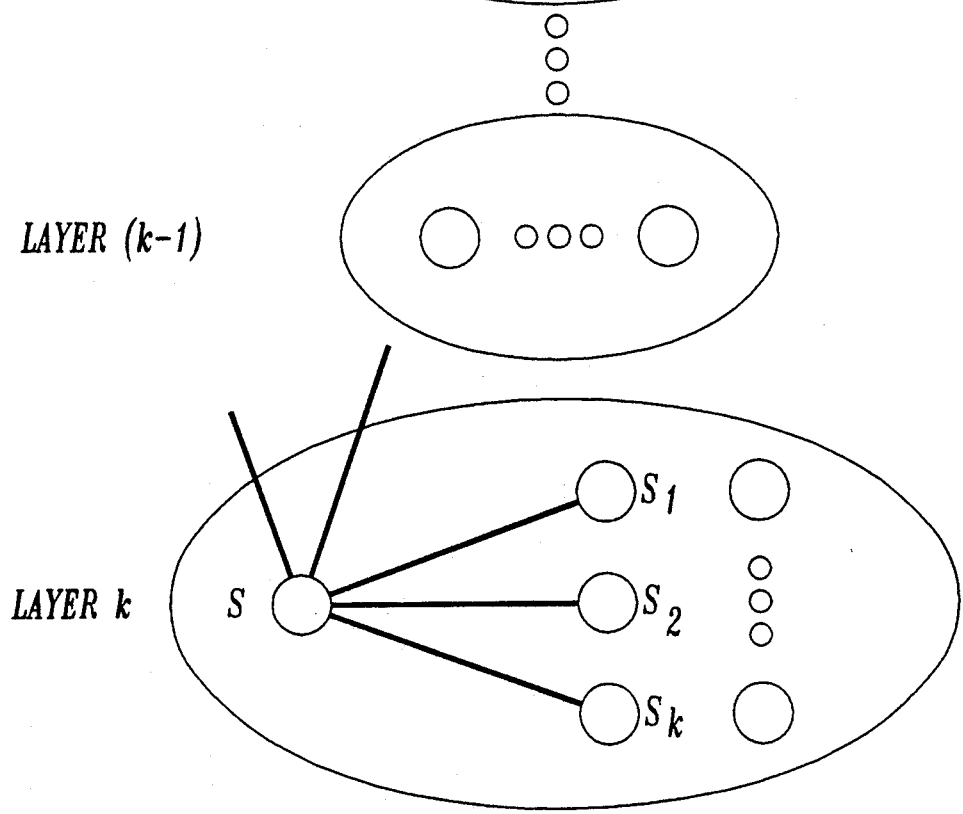
FIG. 20 illustrates multiple nodes in a network, and arrangement of such nodes in k layers.

It is clear from the previous discussion that the topological information needed to construct loop-free alternate routing in accordance with our invention is the layering of the network with respect to every destination node. This information can be readily obtained from the exclusionary tree information which is already available in each node. Consider the layering with respect to destination node D shown in FIG. 20. Suppose that the node at which we are constructing the routing table is node S in layer k. Let node S be connected to nodes $S_1, \ldots S_k$ in layer k. Now, node S knows through its own primary routing table (constructed using exclusionary tree routing) that it is in layer k with respect to D. It also knows from the exclusionary trees received from $S_1, \ldots S_k$, that they are also in layer k with respect to D. There may be other nodes in layer k which S does not know about. But this does not matter as S is not connected to those nodes and hence could not alternate route to any of them. The key is that the exclusionary tree information is sufficient for a node to determine which of its neighbors are in the same layer as itself with respect to any given destination node. (This is unlike a centralized algorithm, in which all nodes have global knowledge of the network topology and, hence, every node knows all the other nodes in its layer. This is more information than needed, since a node only has to know the other nodes in the layer to which it is connected.)

Figure 21:
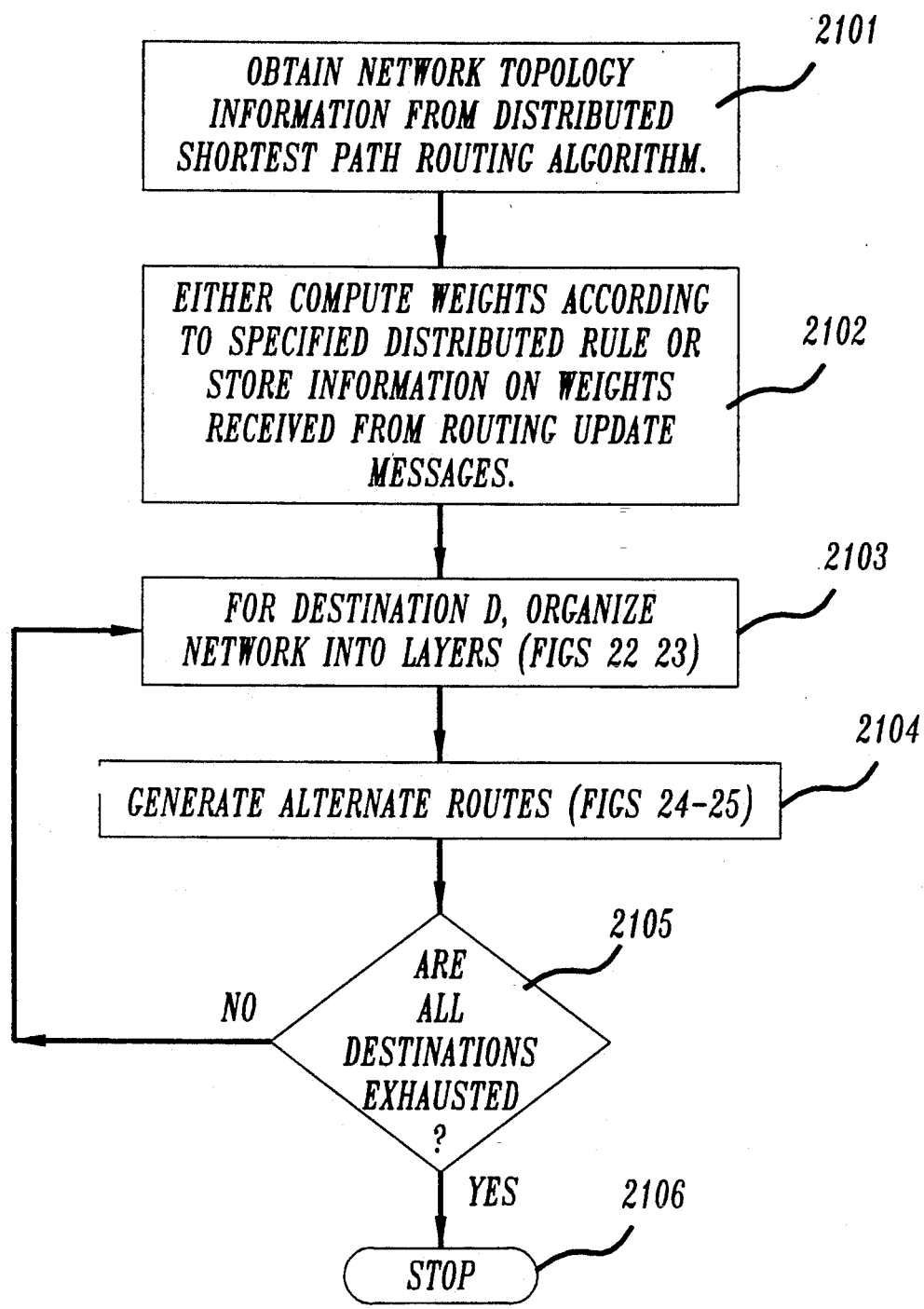
FIG. 21 is a flow chart illustrating the overall process for generating alternate routes in accordance with the invention.

The overall process by which each node determines its secondary routing table is shown in the flow chart of FIG. 21. Initially, in step 2101, network topology information, i.e., the identity of nodes that neighbor the current node is determined from the exclusionary tree routing information already available in the node. If another technique is used to generate the primary route, it is nevertheless assumed that this topology information is at hand. Likewise, in step 2102, the weights $w_{i,j}$ associated with the paths between the current node and its neighbors are computed from V, H coordinates if internodal distance is used as the weighing criteria, as described above. Otherwise, the appropriate weights are stored in the node.

Figure 22:
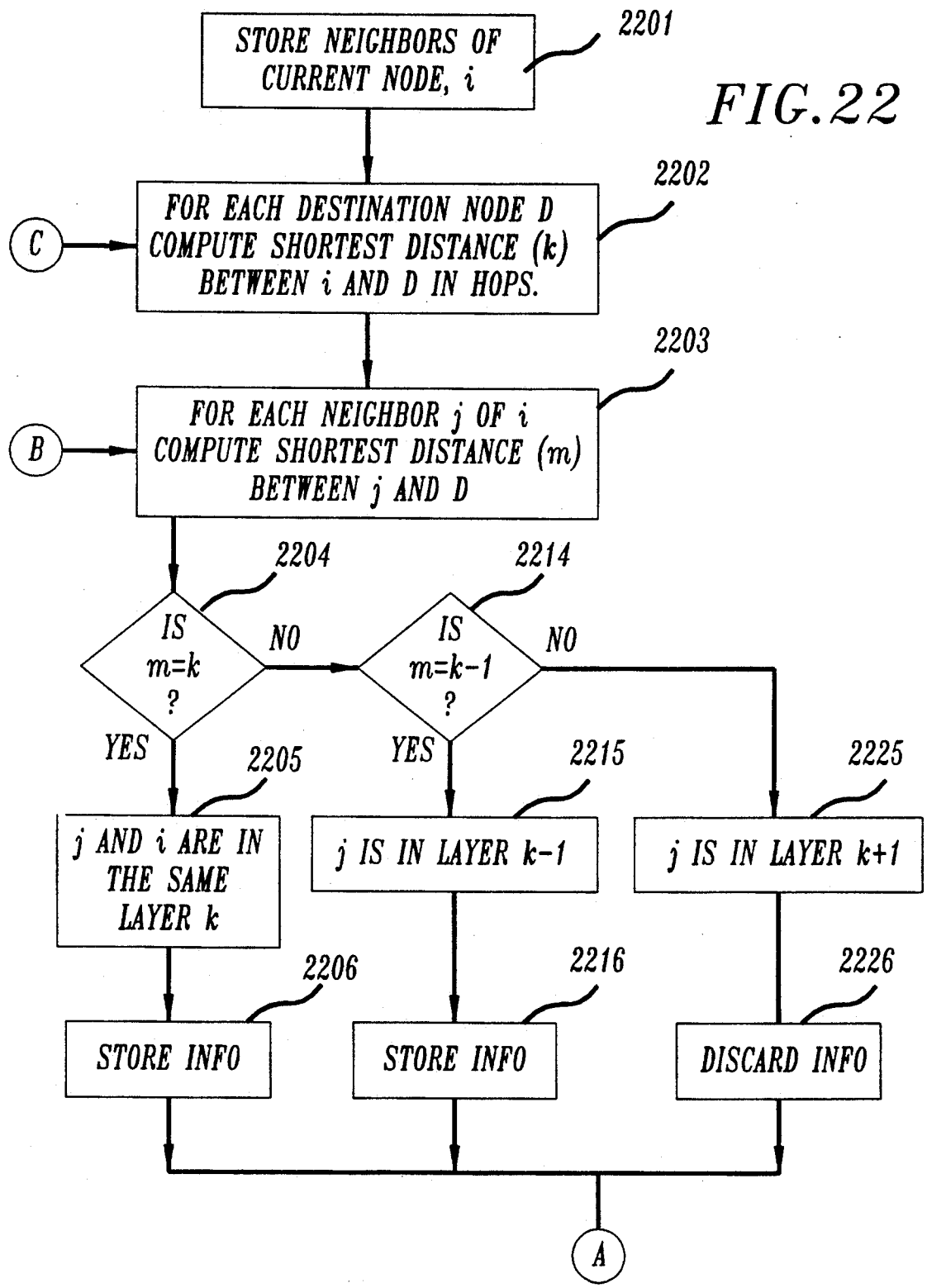
FIGS. 22 and 23 are a flow chart (in two parts) that illustrates the process for performing layering step 2103 of FIG. 21.
Figure 23:
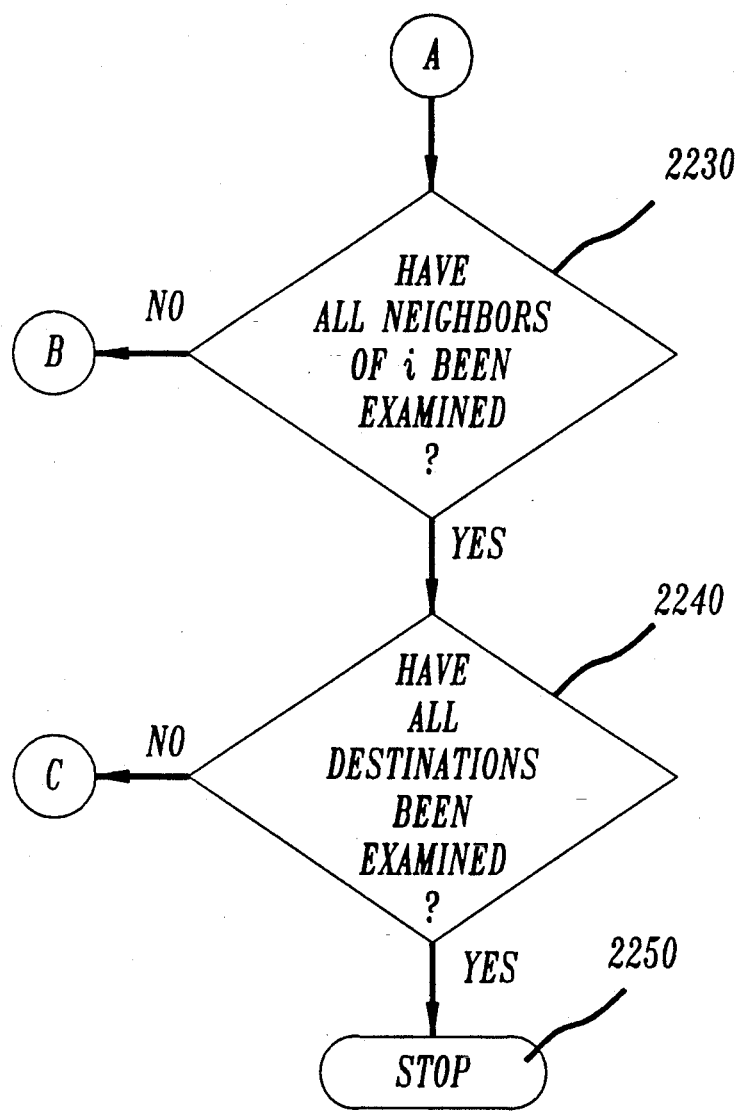

Next, for a destination D, the network of nodes is organized into layers in step 2103, using the process described in more detail in FIGS. 22 and 23. As stated previously, each layer contains all nodes having the same distance, in hops, to the destination, using the shortest available path.

Figure 24:
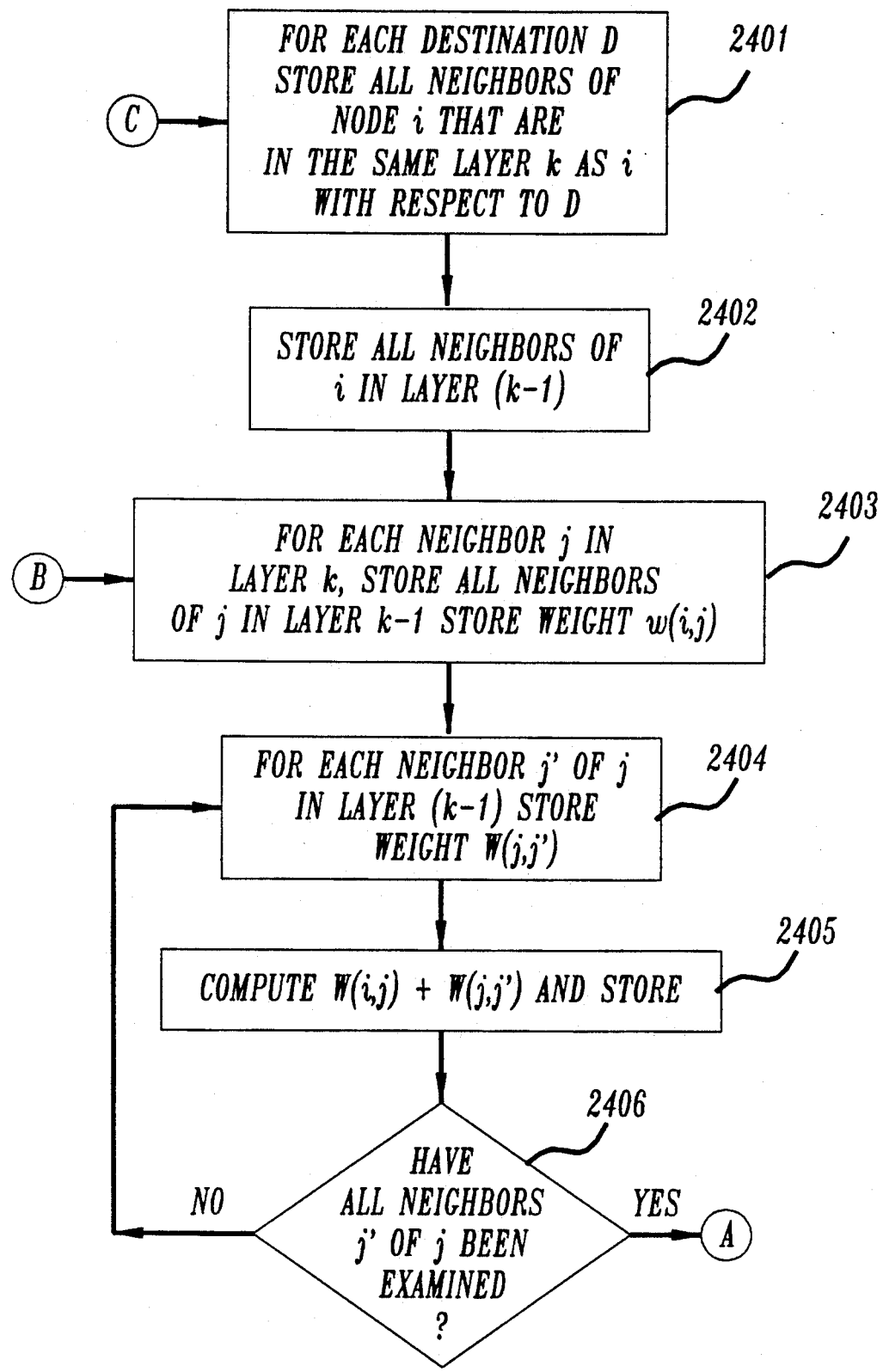
FIGS. 24 and 25 are a flow chart (in two parts) that illustrates in more detail the process of generating alternate routes in accordance with the invention.
Figure 25:
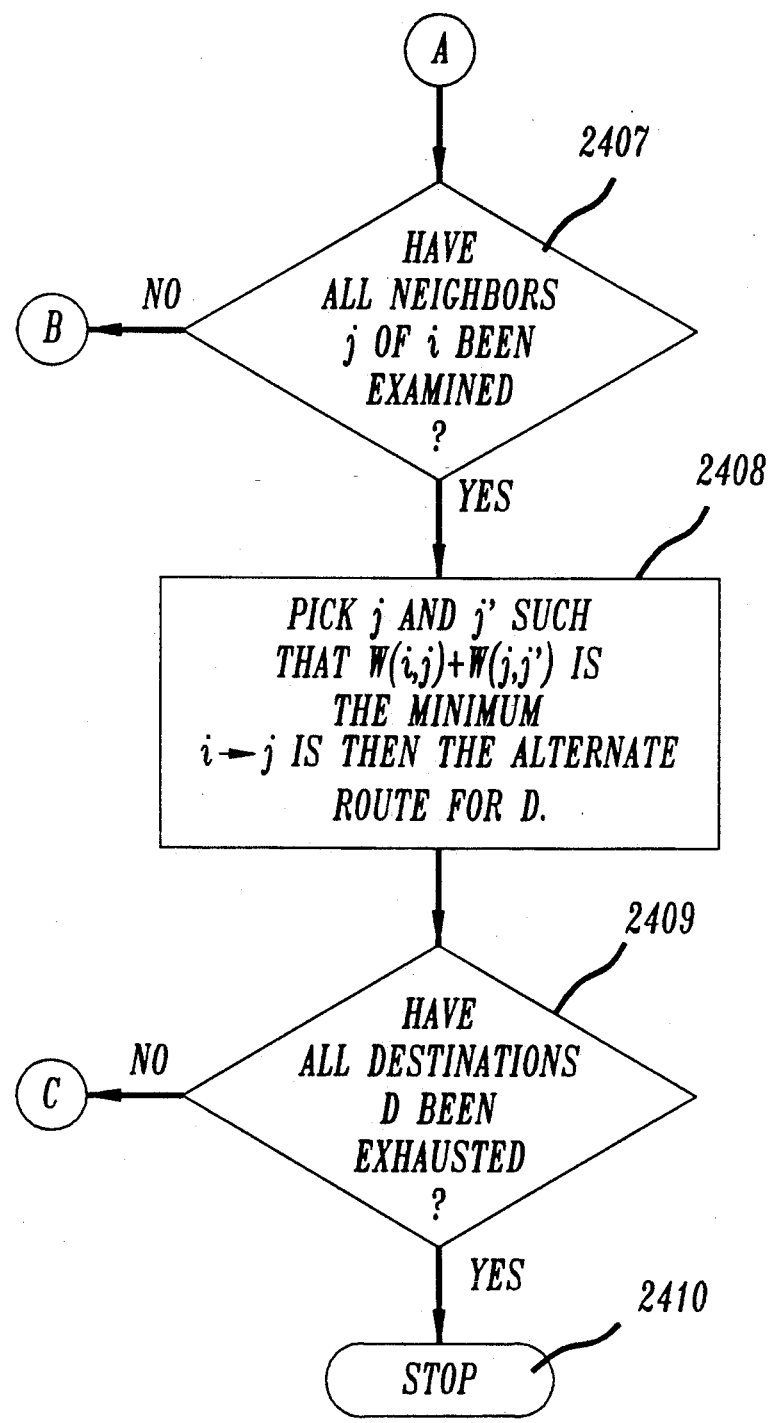

In step 2104 an alternate route to destination D is generated, using the process described in more detail in FIGS. 24-25. This process is distributed, i.e., it is performed in each node independently.

After the alternate route for a given destination has been determined, a decision is made in step 2105 as to whether all destinations have been processed. If not, steps 2103 and 2104 are repeated for the other destinations. If routes for all destinations have been determined, the process stops in step 2106.

The layer generation or organization step 2103 of FIG. 21 is illustrated in more detail in FIGS. 22 and 23. Initially, in step 2201, the identity of each of the neighbors of the current node i are stored in a memory or other suitable storage device. This information would be available at each node if the exclusionary tree routing process is used. In step 2202 the shortest distance (k) in hops, between i and the destination node D is computed. This information is also available as a result of the exclusionary tree routing process. It should be noted, however, that any other distributed shortest path algorithm can be used for primary route selection and any such algorithm would give us the shortest distance in hops. A similar procedure is then repeated for each neighbor j or i, in step 2203, to determine the distance m in hops between j and D. When the results of steps 2202 and 2203 are both available, a comparison between m and k is made in steps 2204 and 2214. If m and k are determined to be equal in step 2204, then it is concluded that j and i are in same layer k (step 2205), and this information is stored (step 2206). If it is determined that $m=k-1$ in step 2214, then it is concluded that j is in layer $k-1$ (step 2215) and this information is stored (step 2216). If the results of steps 2204 and 2214 indicate that m does not equal k or $k-1$, then it is concluded that j is in a more distant layer $k+1$ from D (step 2225). This information is therefore not needed, and is discarded in step 2226.

The layering process is further described in FIG. 23, which is a continuation of FIG. 22. After a particular neighbor j of the current node, i, has been examined to determine whether it is in the same layer k, a closer layer $k-1$, or a more distant layer $k+1$, a determination is made in step 2230 as to whether all neighbors j of node i have been examined. If not, the portion of the process beginning at step 2203 is repeated. After all neighbors of node i have been examined, a determination is made in step 2240 as to whether all destinations D have been examined. If not, the entire layer generation process, beginning at step 2202, is repeated for the next destination. When all destinations have been examined, the layering process is stopped in step 2250.

The alternate route generation process of step 2104 of FIG. 21 is described in more detail in FIGS. 24 and 25. Initially for each destination D, all neighbors of node i that are in the same layer k as i (with respect to destination D) are stored in step 2401. This step thus uses the layering information previously obtained from the procedure described above in connection with FIGS. 22 and 23. In a similar manner, all neighbors of node i in layer $k-1$ (with respect to destination D) are also stored, in step 2402. After information regarding the neighboring nodes has been stored, a determination is made in step 2403 of the weight $w(i,j)$ associated with the link between nodes i and j within layer k. Similarly for each neighbor j' of node j in layer $k-1$, a determination is made in step 2404 of the weight $w(j,j')$ associated with the link between node j in layer k and node j' in layer $k-1$. The sum of the weights $w(i,j)$ and $w(j,j')$ is next computed and stored in step 2405. At this point, a determination is made in step 2406 as to whether all neighbors j' of node j have been examined. If not, steps 2404 and 2405 are repeated for the next neighbor j'. After all neighbors j' have been examined, a determination is made in step 2407 (now referring to FIG. 25) as to whether all neighbors j of node i have been examined. If not, the computation process beginning with step 2403 is repeated. After all neighbors j of node i have been examined the stored combined weights are processed in step 2408 to select nodes j and j' such that $w(i,j)+w(j,j')$ is a minimum. This minimum value determines the specific node j that is the alternate route for traffic from node i that is destined for node D.

After the alternate route for a specific destination D has been computed, a determination is made in step 2409 as to whether all destinations D have been processed. If not, the alternate route generation process beginning at step 2401 is repeated, so that a table of alternate routes, one for end destination, can be formed. When all destinations D have been processed, the process is stopped in step 2410.

Figure 26:
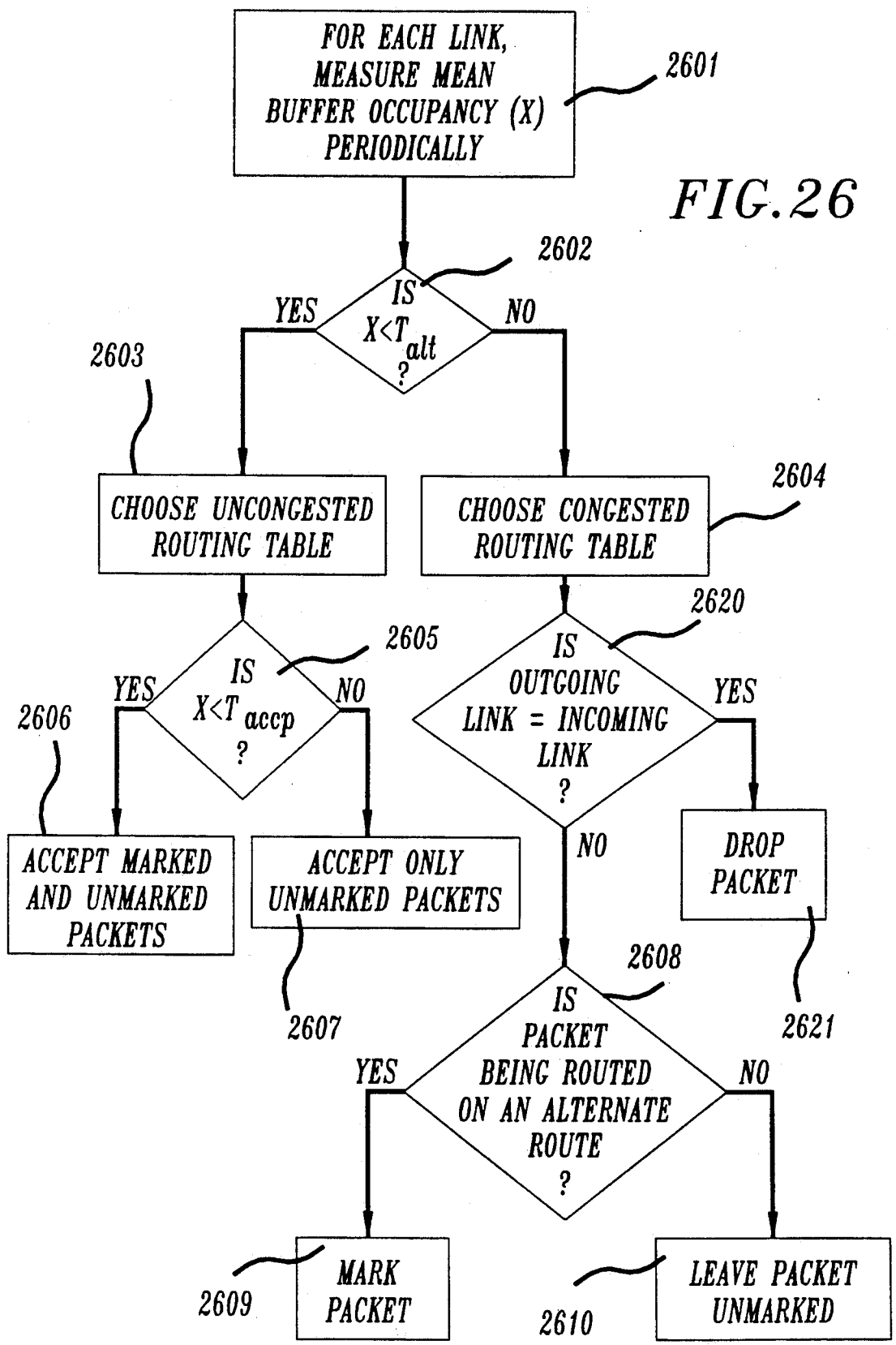
FIG. 26 is a flow chart illustrating the process for giving higher priority to packets that are routed on uncongested routes and for allowing marked packets that travel on alternate routes because of congestion to be discarded in the event that heavy traffic is encountered.

In order to avoid the spread of congestion caused by alternate routing, another feature of our invention is the marking of a bit in the header of all packets that are routed on the alternate path. At all nodes in the alternate path, marked packets are given lower loss priority. This means that if the buffer occupancy at these nodes is below a preset threshold, then the marked packet is admitted, otherwise it is discarded. If the alternate path is also busy, then the alternate routed traffic is dropped and the spread of congestion is avoided. This process is illustrated in FIG. 26.

For each link outgoing from a node, a periodic measurement is made in step 2601 of the occupancy "x" of the buffer associated with that link. If x is determined to be less than a threshold value $T_{alt}$ in step 2602, traffic on that link is uncongested, so that the uncongested routing table is selected in step 2603. If x is also less than a threshold value $T_{accp}$, both marked and unmarked packets are accepted for transmission over that link. However, if x is greater than or equal to $T_{accp}$, traffic on the link is relatively heavy (but still uncongested). In that circumstance, only unmarked packets are accepted in step 2607 for transmission over that link.

If it is determined in step 2602 that buffer occupancy x is equal to or greater than $T_{alt}$, the alternate route is selected in step 2604. However in this event, only a preselected fraction of packets are actually diverted from the primary route and routed on the alternate link. A test is next performed in step 2620 to determine if the outgoing link selected by alternate routing is connected to the same node as the node from which the packet was received. This test is performed in order to avoid single link loops, and is based on information relating to incoming and outgoing links that are readily available in the node. If the test result is positive so that a single link loop would be created, the packet is instead dropped or discarded in step 2621. Otherwise, a determination is made in step 2608 as to whether the alternate trunk was used to route the packet to the next node. If yes, the marking of that packet occurs in step 2609, so that the status of that packet as one having been alternate routed will be recognized in succeeding nodes. On the other hand, if alternate routing is not used, the packet is not marked (step 2610).

In accordance with another aspect of our invention, we have found it advantageous to use link buffer occupancy as a measure of link congestion, to determine when alternate routing should be applied. The activation and deactivation of alternate routing, as well as the decision to accept or reject an alternate routed cell, would then be based upon measurements of link buffer occupancy. Various specific buffer monitoring techniques can be used for this purpose, depending upon implementational convenience. For example, since link buffer occupancy fluctuates at great speed, it can be measured every millisecond. A running average of the 1000 most recent measurements can then be used to monitor congestion. When the average buffer occupancy exceeds a predetermined congestion threshold, some of the traffic is alternate routed, and these packets are marked by setting a loss priority bit in the header.

Figure 27:
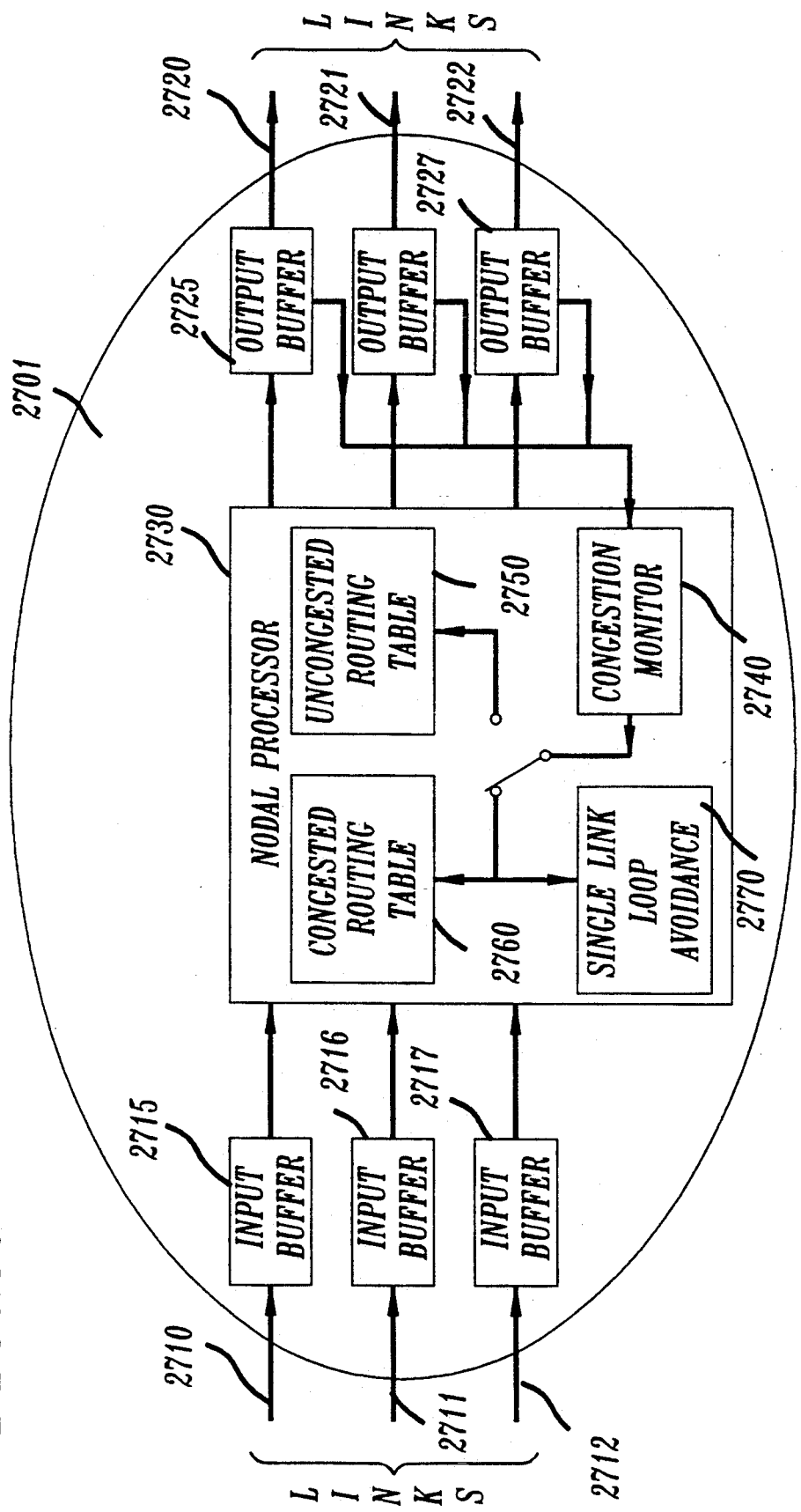
FIG. 27 is a typical functional architecture for the nodes in the networks of FIGS. 1-20.

FIG. 27 illustrates, in simplified form, the functional architecture for a typical node 2701. As shown in that figure node 2701 interconnects a series of incoming links 2710-2712 with a series of outgoing links 2720-2722. Links 2710-2712 and links 2720-2722 may in some implementation each be one or more high speed data trunks. Input buffers 2715-2717 receive packets applied on links 2710-2712, respectively, and apply the packets to a nodal processor 2730 to be described below. Likewise, output buffers 2725-2727 receive packets output from nodal processor 2730 that are destined for links 2720-2722, respectively. The occupancy or fullness of output buffers 2725-2727 are monitored in a congestion monitor 2740 which is part of nodal processor 2730, to determine when one or more links 2720-2722 is congested. The output of congestion monitor 2740 controls nodal processor 2730 such that a primary route to a destination is selected from table 2750 in the absence of congestion and an alternate route to a destination is selected from table 2760 in the presence of congestion. Nodal processor 2730 also includes a single link loop avoidance processor 2770, which is activated when congestion routing is used. The purpose of this processor is to assure that a packet originating at a neighboring node is not sent back to that node, so as to avoid forming a single link loop. This may be accomplished by keeping track of the input link on which a packet is received, and dropping the packet (i.e., not transmitting it) if the congested route specified by congested routing table 2760 is on a link back to the same node.

Figure 28:
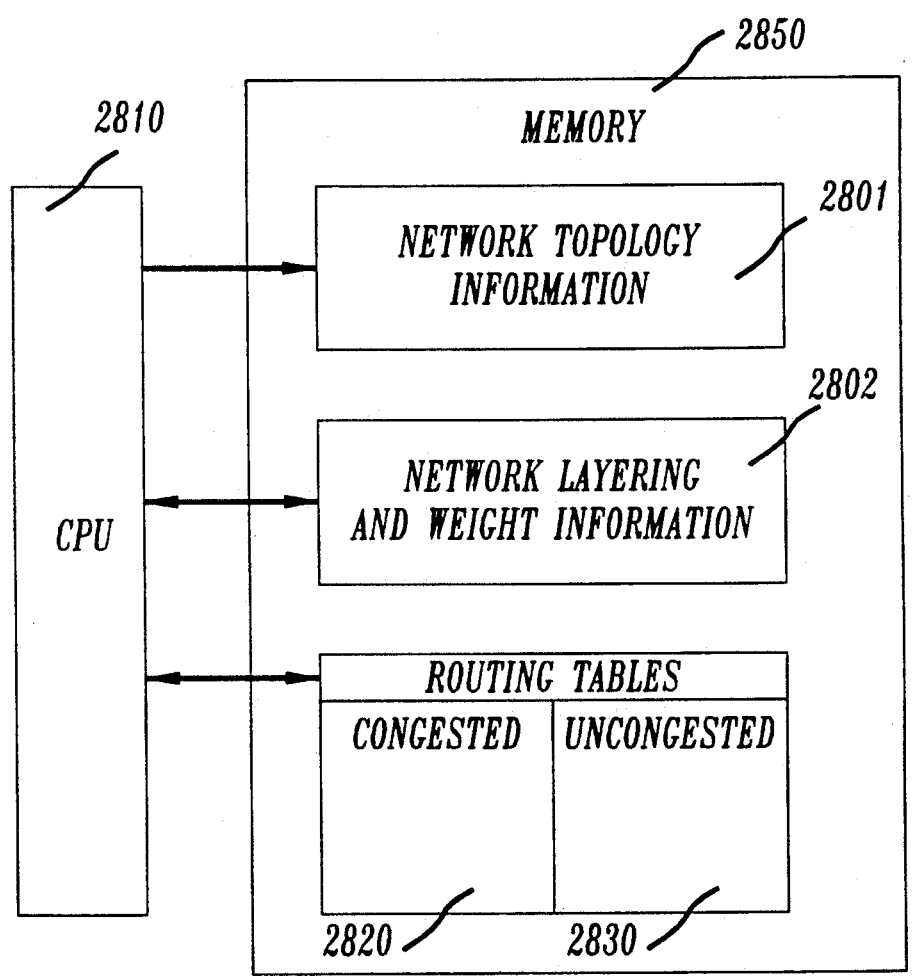
FIG. 28 is a functional diagram of the arrangement of nodal processor 2730 of FIG. 27.

A more complete functional description of the arrangement of nodal processor 2730 is contained in FIG. 28. Nodal processor 2730 contains a central processing unit (CPU) 2810 and a memory 2850 having several portions. The network layering information that results from the process illustrated in FIGS. 22 and 23 is stored for each destination node in portion 2802 of memory 2850, while network topology information is stored in another portion 2801 of the same memory 2850. Weights corresponding to different node pairs are also stored in the same portion of memory 2850.

Whenever there is a change in the network topology, the new network layering is calculated for each destination node and stored in portion 2802. CPU 2810 then uses the network layering information and the weight information to compute primary and alternate paths, which are stored in portions 2820 and 2830 of memory 2850. Persons skilled in the art will recognize that various implementations for CPU 2810 and memory 2850 are readily available.

Figure 29:
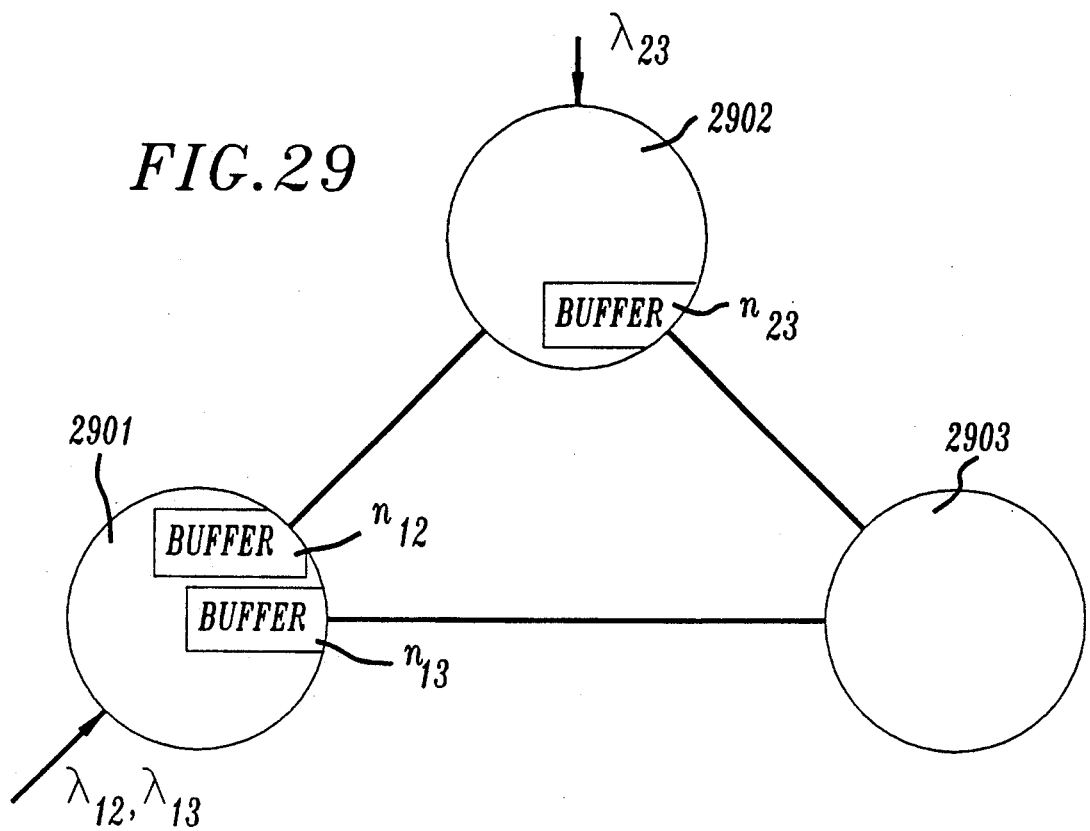
FIG. 29 is a three node network model used in simulations of the present invention.

The benefits afforded by our alternate routing technique can be illustrated using a simple 3 node model of FIG. 29, which permits computation of end-to-end blocking with and without alternate routing for various offered loads. Based on this analysis, we have determined that alternate routing provides very significant improvements in end-to-end blocking.

In FIG. 29, node 2901 has two traffic streams, one destined for node 2902 and the other for node 2903. The traffic destined for node 2902 has a mean arrival rate of $\lambda_{12}$ and the traffic destined for node 2903 has mean arrival rate of $\lambda_{13}$. Node 2902 has a single traffic stream with mean arrival rate $\lambda_{23}$ destined for node 2903. Let us suppose that, $n_{12}$, $n_{13}$, $n_{23}$ are buffers in which cells from the traffic streams corresponding to $\lambda_{12}$, $\lambda_{13}$ and $\lambda_{23}$ queue up for service. All queues are first-in, first-out (FIFO.) All arrivals are assumed Poisson and all service times are exponential. It is assumed that there is no receive buffer overflow and, hence, we do not model the receive buffers.

Using this model, the impact of alternate routing on the $\lambda_{13}$ traffic is examined by subjecting a fraction of the $\lambda_{13}$ traffic to alternate routing so that, if the occupancy in buffer $n_{13}$ exceeds a certain specified threshold, called the rejection threshold, the alternate routable fraction of $\lambda_{13}$ is offered to buffer $n_{12}$, for transmission through node 2. Buffer $n_{12}$ accepts the alternate routed traffic only if its occupancy is below a specified threshold, called the acceptance threshold; if not, it gets rejected and is lost. Once the alternate routed traffic reaches node 2902, it is accepted by buffer $n_{23}$ only if its occupancy is below the acceptance threshold. It is important to note that the node 2901 to 2902 and node 2902 to 2903 traffic streams are not subject to alternate routing. This is because we wish to study the impact of alternate routing on the end-to-end blocking of node 2901 to 2903 traffic, as we increase $\lambda_{13}$ while keeping $\lambda_{12}$ and $\lambda_{23}$ constant. The queueing model corresponding to the network in FIG. 29 is shown in FIG. 30.

Figure 30:
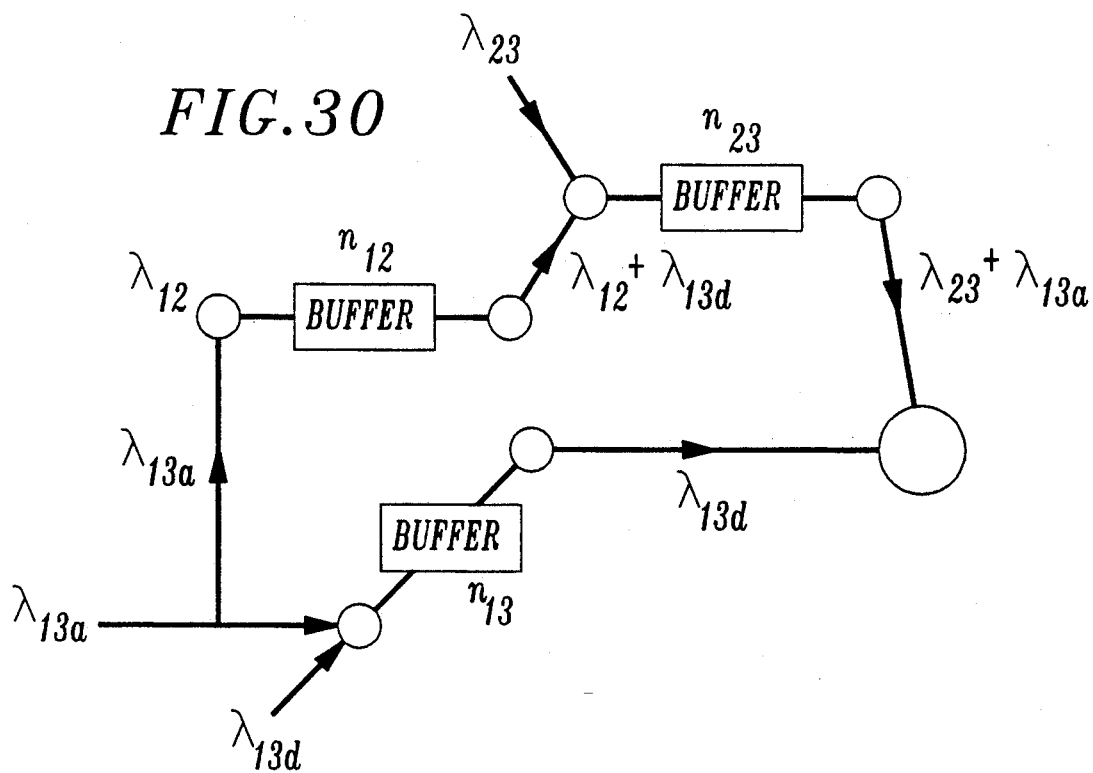
FIG. 30 is a queueing model corresponding to the network of FIG. 29.
Figure 31:
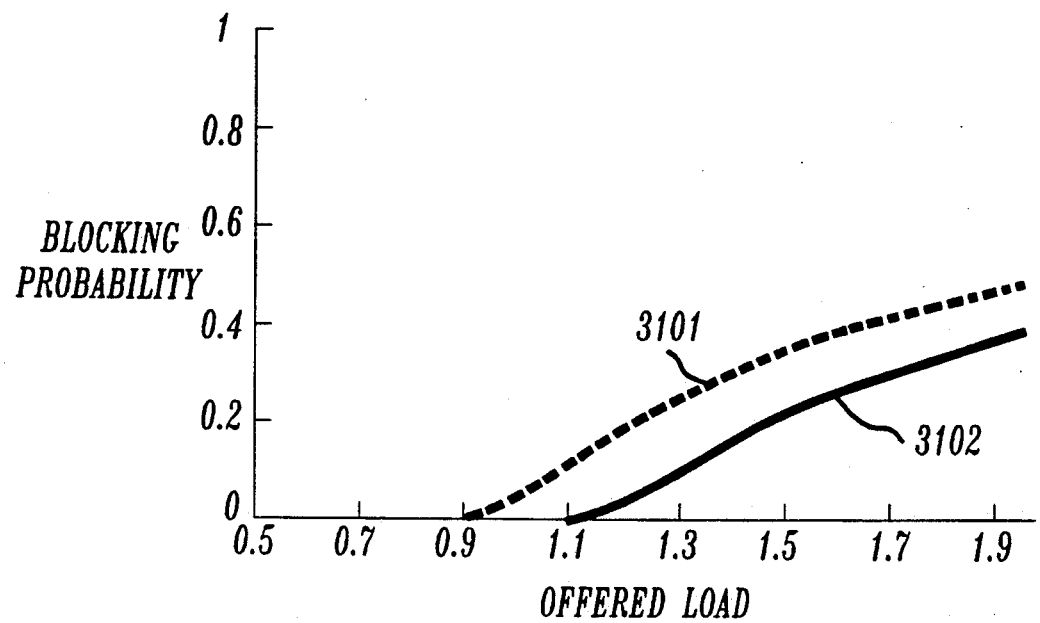
FIG. 31 is a graph illustrating blocking probability with and without alternate routing as a function of offered load.
Figure 32:
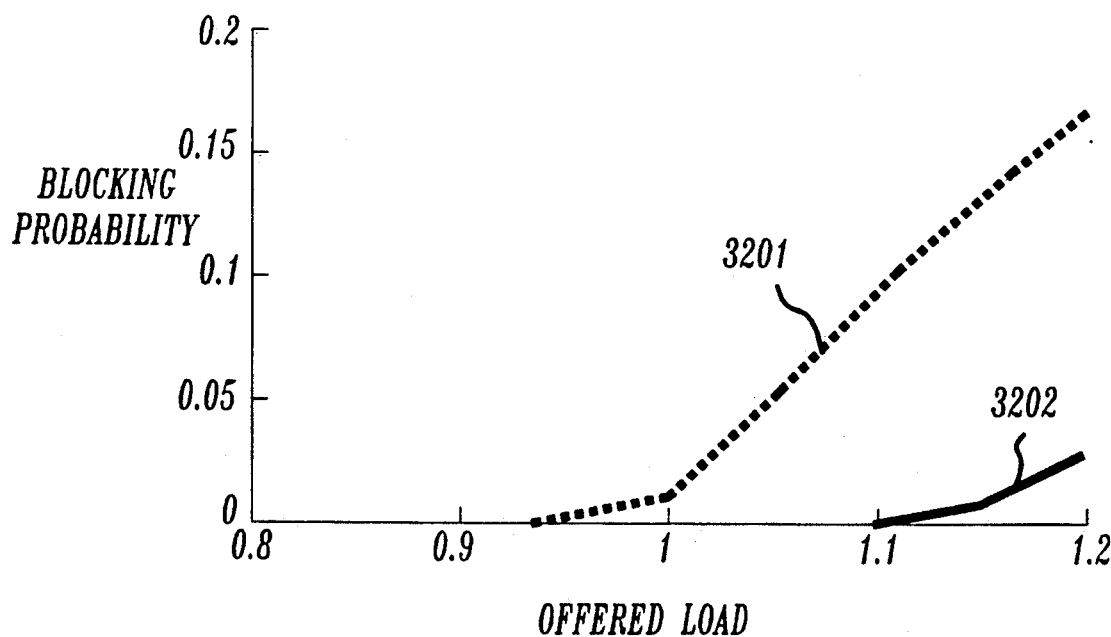
FIG. 32 is a rescaled version of the graph of FIG. 31.

In FIG. 30, $\lambda_{13d}$ denotes the direct routed component of $\lambda_{13}$, and $\lambda_{13a}$ denotes the alternate routable portion of $\lambda_{13}$. The overall arrival rate for the node 2901 to 2903 traffic is $\lambda_{13} = \lambda_{13d} + \lambda_{13a}$. Using a birth-death process model, we have derived exact expressions for the end-to-end blocking suffered by the three traffic classes. In our analysis, we assumed a buffer size of 100 for $n_{12}$, $n_{13}$ and $n_{23}$, since it yields a cell blocking probability of roughly $10^{-6}$ at an offered load of 0.9. We chose the rejection threshold to be 70 and the acceptance threshold to be 50. This means that whenever the occupancy of buffer $n_{13}$ exceeded 70, the cells from the $\lambda_{13a}$ stream are alternate routed to buffer $n_{12}$. Buffer $n_{12}$ accepts the alternate routed $\lambda_{13a}$ cells only if its occupancy is below 50. Similarly, the alternate routed $\lambda_{13a}$ cells are accepted by buffer $n_{23}$ for transmission to node 2903 only if the occupancy at buffer $n_{23}$ is below 50. All cells that are not accepted are lost. In this simple model, we have not accounted for message retransmission. We kept the offered load due to $\lambda_{12}$ and $\lambda_{13}$ constant at 0.8 and varied the offered load due to $\lambda_{13}$ from 0.5 to 2.0. 25% of the 1-to-3 traffic was subject to alternate routing. The end-to-end blocking suffered by the node 2901 to 2903 traffic at these various loads, with and without alternate routing, is shown in FIG. 31. Curve 3101 gives the blocking probability without alternate routing and curve 3102 gives the blocking probability with alternate routing. From FIG. 31, it is clear that there is substantial improvement in end-to-end blocking, with alternate routing. FIG. 31 does not exhibit the sharp increase in blocking that normally occurs with other alternate routing techniques that do not mark packets to avoid the spread of congestion, as advantageously provided in our invention. FIG. 32 is a rescaled version of FIG. 31 showing the end-to-end blocking experienced by the node 2901 to 2903 traffic when the offered load ranges from 0.8 to 1.2. Again, curve 3201 represents blocking probability without alternate routing and curve 3202 represents blocking probability with alternate routing. FIG. 32 clearly shows the dramatic improvement in end-to-end blocking for the node 2901 to 2903 traffic over a range of offered load of practical interest. Because direct routed traffic is given priority (alternate routed traffic is accepted only if the buffer occupancy is below 50), the node 2901 to 2902 and node 2902 to 2903 traffic suffer no significant performance degradation, even when the offered load due to the node 2901 to 2903 traffic is 2.0. The end-to-end blocking for the node 2901 to 2902 and node 2902 to 2903 traffic remains virtually at zero.

In summary, the congestion control scheme in accordance with our invention has the following properties:
  (a) guarantees loop-freedom;
  (b) reacts to measurements and changes paths dynamically;
  (c) needs local measurements only;
  (d) does not spread congestion; and
  (e) carries traffic on lightly loaded links.

Indeed, the invention allows a connectionless network to efficiently carry as much traffic as possible, since packet loss that ordinarily results from buffer overflow is reduced, and the retransmission problem is alleviated. No additional signaling messages need to be exchanged between network nodes.

Various modifications and adaptations of the present invention will be readily apparent to those of ordinary skill in the art. Accordingly, it is intended that the invention be limited only by the appended claims.

We claim:

1. A method of routing information packets from a first node in a network of interconnected nodes to a destination node, comprising the steps of
  a) forming a first routing table containing the primary route to be taken by information packets at said first node destined for said destination node and a second routing table containing an alternate route to be taken by information packets when said primary route is congested;
  b) monitoring congestion in said network; and
  c) routing a portion of said information packets over said alternate route in the presence of congestion; wherein said second routing table is formed by
  d) determining other nodes in said network that are interconnected with said first node;
  e) organizing each of said interconnected nodes including said first node into a series of layers in accordance with their distance, in hops, to said destination node;
  f) assigning a weight to each possible path between said first node and each of said other interconnected nodes in the same layer as said first node;
  g) assigning a weight to each possible path between each of said other interconnected nodes in said same layer and a connected node in a different layer, said different layer being closer to said destination node; and
  h) selecting said alternate route by minimizing the pairwise sum of the weights obtained during said first and second assigning steps (f) and (g) above.

2. The method of claim 1 wherein said weight assigning steps include computing the distance between nodes using coordinate information representing the location of said nodes.

3. A method of controlling congestion in the flow of information bearing packets traveling over paths in a network of interconnected nodes, comprising the steps of
  routing packets from each node to destination nodes via multihop primary routing paths;
  monitoring congestion in said nodes in said network; and
  routing packets from ones of said nodes to said destinations via alternate multihop routing paths in the event that congestion is encountered in said network;
  wherein said alternate routing paths are determined by
  grouping said interconnected nodes into a plurality of layers, each layer containing nodes that are the same distance, in hops from a particular destination;
  assigning a weighting factor to each path between interconnected nodes in said layers;
  assigning a weighting factor to each path between interconnected nodes in adjacent layers; and
  selecting said alternate routing paths as a function of combinations of said weighting factors.

4. The invention defined in claim 3 wherein said primary path contains k hops and said alternate path contains at least k+1 hops.

5. The invention defined in claim 3 wherein said selecting step includes
  forming the pairwise sum of weighting factors assigned during both of said assigning steps.

6. The invention defined in claim 3, wherein said assigning step includes:
  forming said weighting factor as a function of the distance between nodes connected via said paths.

7. The invention defined in claim 3, wherein said alternate route is used only for a portion of the packets intended for a congested primary routing path.

8. The invention defined in claim 7, wherein said method further includes the steps of
  marking any packet transmitted over an alternate routing path;
  examining each packet at each node before it is routed, to determine if it has been marked; and
  routing marked packets only if said node is uncongested.

9. A method of selecting loop free alternate multi-hop paths for information bearing packets traveling over a network of communication nodes, comprising the steps of
  storing in each of said communication nodes information describing the connections between each node in said network and neighboring nodes;
  storing in each of said communication nodes information for assigning weights assigned to paths between each connected pair of nodes;

grouping interconnected nodes into k layers, each layer containing nodes having the same distance, in hops, from a potential destination;

computing, for each node in layer k, the pairwise sum of the stored weights assigned to a) paths between said each node in layer k and a first set of connected nodes in layer k; and b) paths between said first set of connected nodes in layer k and a second set of connected nodes in layer k−1, and selecting as the alternate route from said node in layer k to said potential destination, the path having the smallest of said pairwise sums.

10. The invention defined in claim 9, wherein said first storing step includes forming an adaptive minimum spanning tree representation of said network.

11. The invention defined in claim 9, wherein said second storing step includes storing coordinate information representing the horizontal and vertical location of each of said nodes with respect to a reference system.

12. A method of reducing congestion in a connectionless network including a plurality of interconnected nodes, comprising the steps of associating with each node in said network, a primary route to be taken by at least a portion of traffic from said node destined for each destination node;

associating with each node in said network, an alternate route to be taken by traffic from said node destined for each destination node in the event that said primary route is congested;

monitoring congestion in said network, and routing traffic on said alternate route in the event that congestion is detected;

wherein said first association step includes forming a k-hop route using adaptive minimum spanning tree routing; and wherein said second association step includes forming a route having at least k+1 hops, based upon connectivity information locally available in said each node.

13. In a network of interconnected nodes in which packets are transmitted over a primary route determined by selecting the shortest path, in hops, between the originating node and the destination node, a method of providing an alternate route in the event said primary route is congested, said method comprising the steps of grouping nodes between said originating node and said destination node into a plurality of groups, such that the nodes in the k$^{th}$ group are equally distant, in hops, from said destination node;

assigning a weight w(i,j) to each path between nodes i and j in group k and a weight w(j,j') to each path between node j in group k and node j' in group k−1, determining if said primary route is congested, and if so, routing said packets via an alternate path selected such that w(i,j)+w(j,j') is minimized.

14. A method of determining an alternate route for traffic in a network of nodes when the primary route between said nodes is congested, comprising the steps of for each destination, forming groups of said nodes as a function of the distance of each of said nodes from said destination;

assigning a first weighting factor to each path between a node in one of said groups and each connected node in the same group, and a second weighting factor to each path between each of said connected nodes in the same group and other connected nodes in another of said groups; and responsive to congestion in said network of nodes, selecting said alternate route as a function of said first and second weighting factors.

15. Apparatus for controlling congestion in the flow of information bearing packets traveling over paths in a network of interconnected nodes, comprising a) means for monitoring congestion in primary and secondary routing paths within said network; and b) means for routing packets from each node to destination nodes via multihop primary routing paths in the absence of congestion and for routing packets from ones of said nodes to said destinations via alternate multihop routing paths in the event that congestion is encountered in said primary routing paths;

wherein said routing means includes means for grouping said interconnected nodes into a plurality of layers, each layer containing nodes that are the same distance, in hops from a particular destination;

means for assigning a weighting factor to each path between interconnected nodes in said layers, and for assigning a weighting factor to each path between interconnected nodes in adjacent layers; and means for selecting said alternate routing paths as a function of combinations of said weighting factors.

16. The invention defined in claim 15 wherein said primary path contains k hops and said alternate path contains at least k+1 hops.

17. The invention defined in claim 15 wherein said selecting means includes means for forming pairwise sums of said weighting factors for a) paths between nodes in the same layer, and b) paths between nodes in adjacent layers.

18. The invention defined in claim 15, wherein said assigning means includes:

means for forming said weighting factor as a function of the distance between nodes connected via said paths.

19. The invention defined in claim 15, wherein said routing means is arranged so that said alternate route is used only for a portion of the packets intended for a congested primary routing path.

20. The invention defined in claim 19, wherein said apparatus further includes means for marking any packet transmitted over an alternate routing path;

means for examining each packet at each node before it is routed, to determine if it has been marked; and means for routing marked packets only if said node is uncongested.

21. Apparatus for selecting loop free alternate multihop paths for information bearing packets traveling over a network of communication nodes, comprising means for storing in each of said communication nodes (a) information describing the connections between each node in said network and neighboring nodes, and (b) information for assigning weights to paths between each connected pair of nodes;

means for grouping interconnected nodes into k layers, each layer containing nodes having the same distance, in hops, from a potential destination;

means for computing, for each node in layer k, the pairwise sum of the stored weights assigned to a)

paths between said each node in layer k and a first set of connected nodes in layer k; and b) paths between said first set of connected nodes in layer k and a second set of connected nodes in layer k−1, and means for selecting as the alternate route from said node in layer k to said potential destination, the path having the smallest of said pairwise sums.

22. Apparatus for reducing congestion in a connectionless network including a plurality of interconnected nodes, comprising means for associating with each node in said network a) a primary route to be taken by at least a portion of traffic from said each node destined for each destination node, and b) an alternate route to be taken by traffic from said node destined for each destination node in the event that said primary route is congested;

means for monitoring congestion in said network, and means for routing traffic on said alternate route in the event that congestion is detected;

wherein said associating means includes (a) means for forming a k-hop route using adaptive minimum spanning tree routing, and (b) means for forming a route having at least k+1 hops based upon connectivity information locally available in said each node.

23. In a network of interconnected nodes in which packets are transmitted over a primary route determined by selecting the shortest path, in hops, between the originating node and the destination node, apparatus for providing an alternate route in the event said primary route is congested, said apparatus comprising means for grouping nodes between said originating node and said destination node into a plurality of groups, such that the nodes in the $k^{th}$ group are equally distant, in hops, from said destination node, means for assigning a weight w(i,j) to each path between nodes i and j in group k and a weight w(i,j'), to each path between node j in group k and node j' in group k−1, and means for determining if such primary route is congested; and means responsive to said determining means for routing said packets via an alternate path selected such that w(i,j)+w(i,j') is minimized.

24. Apparatus for determining an alternate route for traffic in a network of nodes when the primary route between said nodes is congested, comprising for each destination, means for forming groups of said nodes as a function of the distance of each of said nodes from said destination;

means for assigning a first weighting factor to each path between a node in one of said groups of each connected node in the same group, and a second weighting factor to each path between each of said connected nodes in the same group and other connected nodes in another of said groups; and means responsive to the occurrence of congestion in said network of nodes for selecting said alternate route as a function of said first and second weighting factors.

* * * * *